(12) United States Patent
Alexander et al.

(10) Patent No.: US 12,480,691 B2
(45) Date of Patent: Nov. 25, 2025

(54) BEVERAGE CONTAINER WITH ACTIVE TEMPERATURE CONTROL

(71) Applicant: Ember Technologies, Inc., Westlake Village, CA (US)

(72) Inventors: Clayton Alexander, Westlake Village, CA (US); Rahul Mulinti, Westlake Village, CA (US); Daren John Leith, Agoura Hills, CA (US); Mikko Juhani Timperi, San Marcos, CA (US); Christopher Thomas Wakeham, Solana Beach, CA (US); Rob Lawson-Shanks, Westlake Village, CA (US)

(73) Assignee: Ember Technologies, Inc., Westlake Village, CA (US)

( * ) Notice: Subject to any disclaimer, the term of this patent is extended or adjusted under 35 U.S.C. 154(b) by 0 days.

(21) Appl. No.: 18/638,443

(22) Filed: Apr. 17, 2024

(65) Prior Publication Data
US 2025/0102201 A1 Mar. 27, 2025

Related U.S. Application Data

(63) Continuation of application No. 17/662,914, filed on May 11, 2022, now Pat. No. 11,965,679, which is a (Continued)

(51) Int. Cl.
F25B 23/00 (2006.01)
F25B 21/04 (2006.01)

(52) U.S. Cl.
CPC ............ F25B 23/006 (2013.01); F25B 21/04 (2013.01); F25D 2331/803 (2013.01);
(Continued)

(58) Field of Classification Search
CPC ........ F25B 23/006; F25B 21/04; F25B 21/02; F25B 2331/083; F25B 2331/805;
(Continued)

(56) References Cited

U.S. PATENT DOCUMENTS 2,210,953 A 8/1940 Replogle
3,213,630 A 10/1965 Mole
(Continued)

FOREIGN PATENT DOCUMENTS

CN 101056528 A 10/2007
CN 102410659 A 4/2012
(Continued)

OTHER PUBLICATIONS

Japanese Office Action regarding Patent Application 2022-527048, dated Apr. 2, 2024, 17 pages.
(Continued)

Primary Examiner — Joseph F Trpisovsky
(74) Attorney, Agent, or Firm — Knobbe, Martens, Olson & Bear LLP

(57) ABSTRACT

A container with active temperature control system is provided. The active temperature control system is operated to heat or cool a chamber sized to receive a beverage therein. The container includes an insulated vessel that has the chamber and a cooling or heating unit. The cooling or heating unit includes a thermoelectric element in thermal communication with the chamber, phase change material in thermal communication with the thermoelectric element, a power storage device, and circuitry to control the operation of the thermoelectric element. The cooling or heating unit is operable to increase or decrease or maintain a temperature of the beverage in the chamber by operating the thermoelectric element to draw heat from the chamber and transfer it to the module of phase change material.

22 Claims, 8 Drawing Sheets

Related U.S. Application Data continuation-in-part of application No. PCT/US2020/059689, filed on Nov. 9, 2020.

(60) Provisional application No. 62/934,151, filed on Nov. 12, 2019.

(52) U.S. Cl.
CPC .. *F25D 2331/805* (2013.01); *F25D 2331/808* (2013.01); *F25D 2331/809* (2013.01)

(58) Field of Classification Search
CPC .......... F25B 2331/808; F25B 2331/809; F25D 2303/0845; F25D 2303/083; F25D 2303/0841; F25D 11/006; F25D 3/08
See application file for complete search history.

(56) References Cited

U.S. PATENT DOCUMENTS

| | | | |
|---|---|---|---|
| 3,310,953 | A | 3/1967 | Rait |
| 3,622,753 | A | 11/1971 | Lax |
| 3,645,249 | A | 2/1972 | Henderson |
| 3,739,148 | A | 6/1973 | Ryckman, Jr. |
| 3,797,563 | A | 3/1974 | Hoffmann |
| 3,892,945 | A | 7/1975 | Lerner |
| 3,931,494 | A | 1/1976 | Fisher |
| 4,068,115 | A | 1/1978 | Mack |
| 4,095,090 | A | 6/1978 | Pianezza |
| 4,134,004 | A | 1/1979 | Anderson |
| 4,240,272 | A | 12/1980 | Tiede |
| 4,470,999 | A | 9/1984 | Carpiac |
| 4,531,046 | A | 7/1985 | Stover |
| 4,537,044 | A | 8/1985 | Putnam |
| 4,751,368 | A | 6/1988 | Daifotes |
| 4,827,107 | A | 5/1989 | Peery |
| 4,978,833 | A | 12/1990 | Knepler |
| 4,980,539 | A | 12/1990 | Walton |
| 4,982,722 | A | 1/1991 | Wyatt |
| 5,042,258 | A | 8/1991 | Sundhar |
| 5,217,064 | A | 6/1993 | Kellow |
| 5,274,215 | A | 12/1993 | Jackson |
| 5,357,080 | A | 10/1994 | Vetter |
| 5,357,185 | A | 10/1994 | Chen |
| 5,497,883 | A | 3/1996 | Monetti |
| 5,549,035 | A | 8/1996 | Wing-Chung |
| 5,550,452 | A | 8/1996 | Shirai |
| 5,572,872 | A | 11/1996 | Hlavacek |
| 5,603,220 | A | 2/1997 | Seaman |
| 5,603,858 | A | 2/1997 | Wyatt |
| 5,643,485 | A | 7/1997 | Potter |
| 5,731,568 | A | 3/1998 | Malecek |
| 5,842,353 | A | 12/1998 | Kuo-Liang |
| 5,884,006 | A | 3/1999 | Frohlich |
| 5,948,301 | A | 9/1999 | Liebermann |
| 5,959,433 | A | 9/1999 | Rohde |
| 6,013,901 | A | 1/2000 | Lavoie |
| 6,020,575 | A | 2/2000 | Nagle |
| 6,072,161 | A | 6/2000 | Stein |
| 6,089,409 | A | 7/2000 | Hart |
| 6,108,489 | A | 8/2000 | Frohlich |
| 6,110,159 | A | 8/2000 | Tsujita |
| 6,123,226 | A | 9/2000 | Giattino et al. |
| 6,140,614 | A | 10/2000 | Padamsee |
| 6,144,016 | A | 11/2000 | Garvin |
| 6,158,227 | A | 12/2000 | Seeley |
| 6,279,470 | B2 | 8/2001 | Simeray |
| 6,281,611 | B1 | 8/2001 | Chen |
| 6,297,482 | B1 | 10/2001 | Becker |
| 6,314,867 | B1 | 11/2001 | Russell |
| 6,320,169 | B1 | 11/2001 | Clothier |
| 6,376,803 | B1 | 4/2002 | Klinger |
| 6,403,928 | B1 | 6/2002 | Ford |
| 6,414,278 | B1 | 7/2002 | Frohlich |
| 6,543,335 | B1 | 4/2003 | Lassota |
| 6,584,374 | B2 | 6/2003 | Lee |
| 6,663,009 | B1 | 12/2003 | Bedetti |
| 6,674,052 | B1 | 1/2004 | Luo |
| 6,818,867 | B2 | 11/2004 | Kressmann |
| 6,852,954 | B1 | 2/2005 | Liu |
| 6,870,135 | B2 | 3/2005 | Hamm |
| 6,953,913 | B1 | 10/2005 | Hara |
| 7,034,256 | B1 | 4/2006 | Phillips |
| 7,089,749 | B1 | 8/2006 | Schafer |
| 7,091,455 | B2 | 8/2006 | Fung |
| 7,109,445 | B2 | 9/2006 | Patterson |
| 7,193,190 | B2 | 3/2007 | Kissel, Jr. |
| 7,263,283 | B2 | 8/2007 | Knepler |
| 7,276,676 | B1 | 10/2007 | Thompson |
| 7,414,380 | B2 | 8/2008 | Tang |
| 7,419,073 | B2 | 9/2008 | Crisp, III |
| 7,571,830 | B2 | 8/2009 | Lin |
| 7,592,084 | B2 | 9/2009 | Hoffjann |
| 7,659,493 | B2 | 2/2010 | Reusche |
| 7,683,572 | B2 | 3/2010 | Toya |
| 7,825,353 | B2 | 11/2010 | Shingler |
| 7,948,209 | B2 | 5/2011 | Jung |
| 7,966,927 | B2 | 6/2011 | Yoakim |
| 7,997,786 | B2 | 8/2011 | Liu |
| 8,055,310 | B2 | 11/2011 | Beart |
| 8,061,149 | B1 | 11/2011 | Gowans |
| 8,146,485 | B2 | 4/2012 | Ozanne |
| 8,274,016 | B2 | 9/2012 | Montana |
| 8,319,154 | B2 | 11/2012 | Shaikh |
| 9,151,545 | B2 | 10/2015 | Soukhojak |
| 9,153,986 | B1 | 10/2015 | Herr |
| 9,184,427 | B2 | 11/2015 | Chuang |
| 9,351,600 | B2 | 5/2016 | Rime |
| 9,581,138 | B2 | 2/2017 | Scofield et al. |
| 9,581,384 | B1 | 2/2017 | Scofield |
| 9,642,191 | B2 | 5/2017 | Everett, Jr. |
| 9,797,652 | B1 | 10/2017 | Wilkerson |
| 9,801,482 | B1 | 10/2017 | Alexander |
| 9,974,401 | B2 | 5/2018 | Alexander |
| 9,995,529 | B1 | 6/2018 | Banks |
| 10,010,213 | B2 | 7/2018 | Alexander |
| 10,173,571 | B2 | 1/2019 | Park et al. |
| 10,845,113 | B2 | 11/2020 | Tsuno |
| 11,771,260 | B2 | 10/2023 | Alexander |
| 11,771,261 | B2 | 10/2023 | Alexander |
| 2001/0009609 | A1 | 7/2001 | Bradenbaugh |
| 2001/0023866 | A1 | 9/2001 | Wang |
| 2002/0014482 | A1 | 2/2002 | Becker |
| 2002/0023912 | A1 | 2/2002 | Mcgee |
| 2002/0083840 | A1 | 7/2002 | Lassota |
| 2002/0113062 | A1 | 8/2002 | Cranford |
| 2002/0129712 | A1 | 9/2002 | Westbrook |
| 2002/0162339 | A1 | 11/2002 | Harrison et al. |
| 2002/0175158 | A1 | 11/2002 | Sanoner |
| 2003/0010768 | A1 | 1/2003 | Li |
| 2003/0029862 | A1 | 2/2003 | Clothier |
| 2003/0029876 | A1 | 2/2003 | Giraud |
| 2003/0122455 | A1 | 7/2003 | Caldwell |
| 2003/0155345 | A1 | 8/2003 | Kara |
| 2004/0007553 | A1 | 1/2004 | Smolko |
| 2004/0140304 | A1* | 7/2004 | Leyendecker ...... A47J 36/2433 219/521 |
| 2004/0159240 | A1 | 8/2004 | Lyall, III |
| 2004/0194470 | A1 | 10/2004 | Upadhye |
| 2004/0212120 | A1 | 10/2004 | Giraud |
| 2005/0104185 | A1 | 5/2005 | Shimogishi et al. |
| 2005/0121431 | A1 | 6/2005 | Yuen |
| 2005/0172952 | A1 | 8/2005 | Williams |
| 2006/0049169 | A1 | 3/2006 | Li |
| 2006/0207442 | A1 | 9/2006 | Pettersson |
| 2006/0261233 | A1 | 11/2006 | Williams |
| 2007/0024237 | A1 | 2/2007 | Cole, Jr. |
| 2007/0051727 | A1 | 3/2007 | Holley, Jr. |
| 2007/0089749 | A1 | 4/2007 | Ho et al. |
| 2007/0144205 | A1 | 6/2007 | Moore |
| 2007/0151457 | A1 | 7/2007 | Rabin |
| 2007/0182367 | A1 | 8/2007 | Partovi |
| 2007/0223895 | A1 | 9/2007 | Flemm |
| 2007/0279002 | A1 | 12/2007 | Partovi |

(56) References Cited

U.S. PATENT DOCUMENTS

| | | |
|---|---|---|
| 2008/0011077 A1 | 1/2008 | Ramus |
| 2008/0019122 A1 | 1/2008 | Kramer |
| 2008/0041233 A1 | 2/2008 | Bunn |
| 2008/0121630 A1 | 5/2008 | Simard |
| 2008/0149624 A1 | 6/2008 | Tamura |
| 2008/0179311 A1 | 7/2008 | Koro |
| 2008/0190914 A1 | 8/2008 | Gibson |
| 2008/0213449 A1 | 9/2008 | Wisner |
| 2008/0251063 A1 | 10/2008 | Palena |
| 2008/0315596 A1 | 12/2008 | Terry |
| 2009/0038317 A1 | 2/2009 | Otey |
| 2009/0049845 A1 | 2/2009 | McStravick et al. |
| 2009/0102296 A1 | 4/2009 | Greene |
| 2009/0152276 A1 | 6/2009 | Groll |
| 2009/0166350 A1 | 7/2009 | Ho |
| 2009/0184102 A1 | 7/2009 | Parker, Jr. |
| 2010/0000980 A1 | 1/2010 | Popescu |
| 2010/0028758 A1 | 2/2010 | Eaves |
| 2010/0158489 A1 | 6/2010 | Siu |
| 2010/0251755 A1 | 10/2010 | Lauchnor |
| 2010/0281909 A1 | 11/2010 | Carpanzano |
| 2011/0056215 A1 | 3/2011 | Ham |
| 2011/0062149 A1 | 3/2011 | Oriel |
| 2011/0072978 A1 | 3/2011 | Popescu |
| 2011/0092072 A1 | 4/2011 | Singh |
| 2011/0108506 A1 | 5/2011 | Lindhorst-Ko |
| 2011/0121660 A1 | 5/2011 | Azancot |
| 2011/0152979 A1 | 6/2011 | Driscoll |
| 2011/0180527 A1 | 7/2011 | Abbott |
| 2011/0259871 A1 | 10/2011 | Li |
| 2011/0265562 A1 | 11/2011 | Li |
| 2012/0064470 A1 | 3/2012 | Delattre |
| 2012/0082766 A1 | 4/2012 | Maupin |
| 2012/0103562 A1 | 5/2012 | Alexander |
| 2012/0312031 A1 | 12/2012 | Olsen et al. |
| 2013/0059259 A1 | 3/2013 | Oldani |
| 2013/0192961 A1 | 8/2013 | Waters |
| 2013/0221013 A1 | 8/2013 | Kolowich et al. |
| 2014/0152933 A1 | 6/2014 | Anupongongarch |
| 2014/0165607 A1 | 6/2014 | Alexander |
| 2014/0360208 A1 | 12/2014 | Sadot et al. |
| 2015/0024349 A1 | 1/2015 | Bischoff |
| 2015/0122688 A1 | 5/2015 | Dias |
| 2015/0335184 A1 | 11/2015 | Balachandran |
| 2016/0183730 A1 | 6/2016 | Bedi |
| 2016/0242598 A1 | 8/2016 | Alexander |
| 2016/0339822 A1 | 11/2016 | Park et al. |
| 2017/0042373 A1 | 2/2017 | Alexander et al. |
| 2017/0150840 A1 | 6/2017 | Park |
| 2017/0205139 A1 | 7/2017 | Sofield |
| 2017/0234610 A1 | 8/2017 | Jones |
| 2018/0051918 A1 | 2/2018 | Vantubergen, Jr. |
| 2018/0085551 A1 | 3/2018 | Krietzman |
| 2018/0202711 A1 | 7/2018 | Alexander et al. |
| 2018/0360264 A1 | 12/2018 | Alexander |
| 2019/0049173 A1 | 2/2019 | Jabou |
| 2019/0223635 A1 | 7/2019 | Alexander |
| 2020/0208909 A1 | 7/2020 | Chang |
| 2020/0345180 A1 | 11/2020 | Alexander et al. |
| 2021/0235931 A1 | 8/2021 | Souris |
| 2021/0310729 A1 | 10/2021 | Alexander |
| 2022/0268495 A1 | 8/2022 | Alexander et al. |
| 2022/0361695 A1 | 11/2022 | Alexander |
| 2025/0057358 A1 | 2/2025 | Alexander |

FOREIGN PATENT DOCUMENTS

| | | | |
|---|---|---|---|
| CN | 107917564 A | | 4/2018 |
| CN | 207299604 U | | 5/2018 |
| DE | 40 36 210 A1 | | 5/1992 |
| DE | 102009023761 A1 | | 12/2010 |
| DE | 102015106882 B3 | | 8/2016 |
| ES | 2372458 A1 | | 1/2012 |
| ES | 2372458 B1 | | 1/2012 |
| FR | 2759774 A1 | | 8/1998 |
| JP | H08-170869 A | | 7/1994 |
| JP | H08-21679 A | | 1/1996 |
| JP | 2001/201233 A | | 7/2001 |
| JP | 2003-106728 A | | 4/2003 |
| JP | 2004-319658 A | | 11/2004 |
| JP | 2005-164088 A | | 6/2005 |
| JP | 2007-113805 A | | 5/2007 |
| JP | 2007-181479 A | | 7/2007 |
| JP | 2008-150056 A | | 7/2008 |
| JP | 2017-202854 A | | 11/2017 |
| JP | 2019-507314 A | | 3/2019 |
| KR | 2001063667 A | * 7/2001 | ............. F25B 21/02 |
| KR | 10-2021-0114240 A | | 9/2021 |
| WO | WO 2014/166867 A1 | | 10/2014 |
| WO | WO 2017/137774 A2 | | 8/2017 |
| WO | WO 2017/192396 A1 | | 11/2017 |
| WO | WO 2017/195461 A1 | | 11/2017 |
| WO | WO 2017/197026 A1 | | 11/2017 |
| WO | WO 2018/130252 A1 | | 7/2018 |
| WO | WO 2019/152219 A1 | | 8/2019 |

OTHER PUBLICATIONS

Chinese Notice of First Office Action and Office Action with English Translation, regarding Application No. 202080083898.7, Issuance No. 2024062900027560, dated Jun. 29, 2024, 21 pages.

Japanese Office Action and Translation, regarding Japanese Patent Application No. 2021-513325, dated Aug. 29, 2023, 14 pages.

Invitation to Pay Additional Fees dated Mar. 21, 2019, received in International Patent Application No. PCT/US2019/014198.

International Search Report and Written Opinion dated May 22, 2019, received in International Patent Application No. PCT/US2019/014198.

International Search Report and Written Opinion, dated Feb. 24, 2021, received in International Application No. PCT/US2020/059689, in 16 pages.

Machine translation of DE102009023761 (Year: 2006).

Office Action dated Nov. 27, 2024, received in European Patent Application No. 20816840.1, in 9 pages.

Japanese Office Action, "Notice Of Reasons For Refusal" (English translation), regarding Japanese Patent Application No. 2022-527048, dated Jan. 14, 2025, 17 pages.

Australian Examination Report, regarding Application No. 2020384487, dated Sep. 8, 2025, 3 pages.

\* cited by examiner

BEVERAGE CONTAINER WITH ACTIVE TEMPERATURE CONTROL

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57 and should be considered a part of this specification.

BACKGROUND OF THE INVENTION

Field of the Invention

The invention is directed to a beverage container, and more particularly to a beverage container with active temperature control that can receive beverage therein.

Description of the Related Art

Many beverages (e.g., soda, beer) are packaged in metal (e.g., aluminum) cans for individual consumption (e.g., at parties, picnics, outdoor events, etc.). Such beverages are often consumed in a cooled or chilled state (e.g., by placing the cans in a refrigerator or on ice, such as in a cooler). However, once the cans are taken out of the refrigerator or removed from ice, the temperature of the can and its beverage changes over time due to heat from the user's hand while holding the can and due to ambient air exposure. Insulated sleeves made of flexible or deformable fabric or foam (typically called a "koozie") are often used to hold a can therein (e.g., a soda can, a beer can), to thermally insulate the beverage in the container and keep it cold for a longer period of time. However, such koozies do not keep the beverage cold for an extended period of time.

SUMMARY

Accordingly, there is a need for an improved individual portable cooler that can receive a metal (e.g., aluminum) container (e.g., can) therein to cool the metal can and its contents (e.g., a beverage). The individual portable cooler can be sized to receive a single metal container (e.g., a soda can, a beer can, for example made of aluminum) at least partially in a chamber of the cooler. The cooler can maintain the metal can and/or its contents at in a cooled state for a prolonged period of time (e.g., ½ hour, 1 hour, 2 hours, 3 hours, etc.). In one example, the cooler can maintain the metal can and/or its contents at a desired temperature or temperature range.

In accordance with one aspect, an individual portable cooler container with an active temperature control system is provided. In one example, the active temperature control system is operated to cool a chamber of a vessel of the cooler that receives the metal container or can.

In accordance with another aspect, a cooler container with active temperature control is provided. The container comprises a container body having a chamber defined by a base and an inner peripheral wall of the container body. The container also comprises a temperature control system comprising one or more thermoelectric elements configured to actively heat or cool at least a portion of the chamber, and circuitry configured to control an operation of the one or more thermoelectric elements to heat or cool at least a portion of the chamber to a predetermined temperature or temperature range. The chamber is sized to receive at least a portion of a metal container (e.g., an aluminum can) therein, and the temperature control system is configured to operate to increase or decrease or maintain a temperature of the metal container and its contents (e.g., a beverage) at a predetermined temperature or in a predetermined temperature range for a prolonged period of time (e.g., ½ hour, 1 hour, 2 hours, 3 hours, etc.).

Optionally, the container can include one or more batteries configured to provide power to one or both of the circuitry and the one or more thermoelectric elements.

Optionally, the circuitry is further configured to wirelessly communicate with a remote electronic device (e.g., a mobile phone).

In accordance with one aspect of the disclosure, a container with active temperature control is provided. The container comprises an insulated vessel body having a chamber configured to receive a beverage therein and a cooling or heating unit. The cooling or heating unit comprises a thermoelectric element having a first side in thermal communication with at least a portion of the chamber, a module of thermal mass or phase change material in thermal communication with a second side of the thermoelectric element that is opposite the first side, a power storage device and circuitry configured to control an operation of the thermoelectric element. The cooling or heating unit is operable to increase or decrease or maintain a temperature of at least a portion of the beverage in the chamber by operating the thermoelectric element to draw heat from the chamber and transfer it to the module of thermal mass or phase change material.

In accordance with another aspect of the disclosure, a container system with active temperature control is provided. The system comprises an insulated vessel body having a chamber configured to receive a beverage therein, and a cooling or heating unit. The cooling or heating unit comprises a thermoelectric element having a first side in thermal communication with at least a portion of the chamber, a module of thermal mass or phase change material in thermal communication with a second side of the thermoelectric element that is opposite the first side, a power storage device and circuitry configured to control an operation of the thermoelectric element. The system also comprises a charging module for charging the cooling or heating unit. The cooling or heating unit is operable to increase or decrease or maintain a temperature of at least a portion of the beverage in the chamber by operating the thermoelectric element to draw heat from the chamber and transfer it to the module of thermal mass or phase change material.

DETAILED DESCRIPTION

Figure 1:
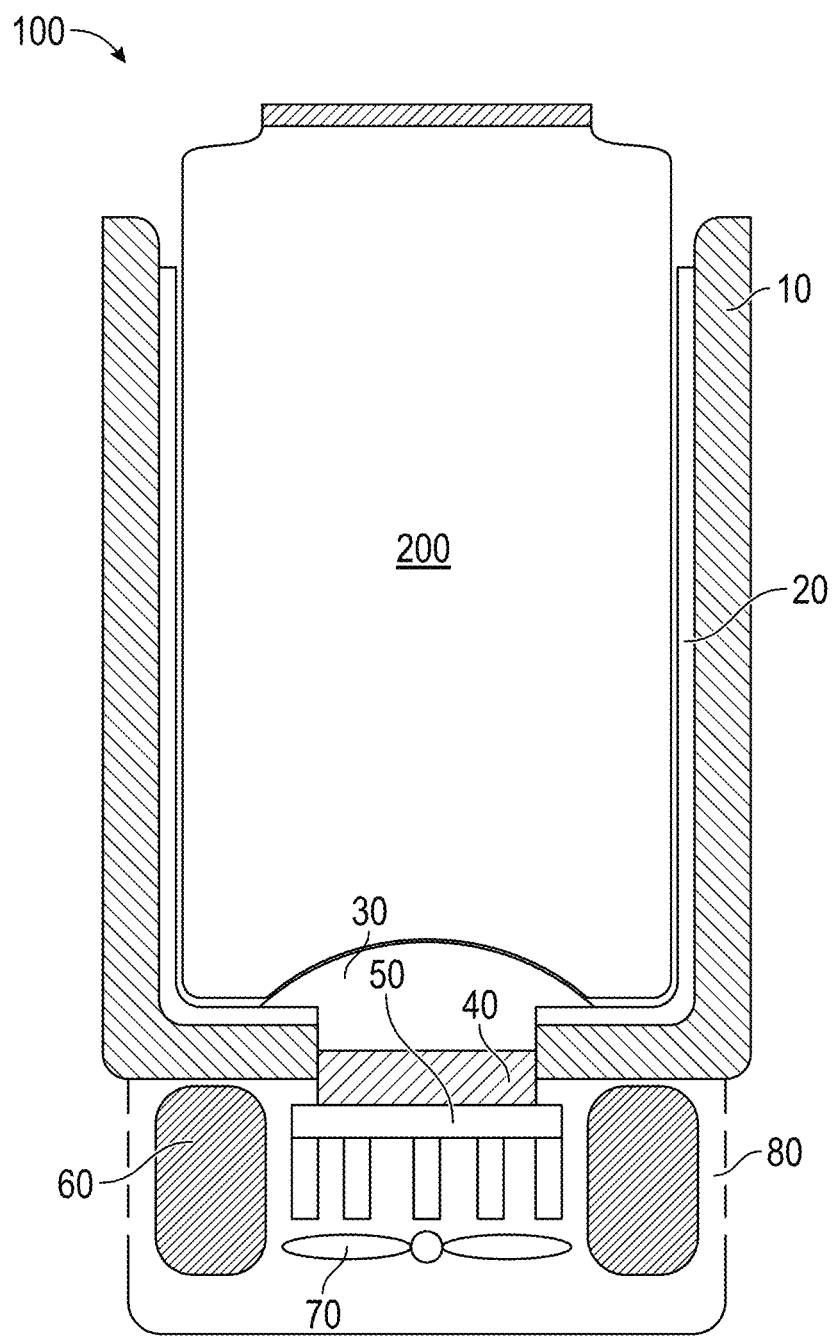
FIG. 1 is cross-sectional view of a cooler container.

FIG. 1 illustrates a cooler container assembly 100 (the "cooler"). The cooler 100 can include an insulated cylindrical vessel 10 with an open top end and a closed bottom end with an opening (e.g., a central opening) therethrough. In one implementation, the vessel 10 can be double walled with an outer peripheral wall (e.g., an outer cylindrical wall) spaced apart by a gap from an inner peripheral wall (e.g., an inner cylindrical wall). In one example, the gap can be filled with air. In another example, the gap can be filled with an insulating material (e.g., foam). In another example, the gap can be under a vacuum. Advantageously, the inner peripheral wall is insulated from the outer peripheral wall (e.g., so that heat from a user's hand holding the cooler 100 is not transferred to the inner peripheral wall to inhibit heat transfer to the metal can and its contents in the cooler). In another implantation, the vessel 10 can be single walled. In one implementation, the vessel 10 is made of a thermally insulative material (e.g., plastic, other polymer material, other non-metallic material).

The cooler 100 can optionally have an inner peripheral liner 20 (the "liner") in thermal communication with (e.g., in thermal contact with, in direct contact with) the beverage container inserted into a chamber of the liner 20. The liner 20 will optionally contact the inner peripheral wall (e.g., the inner cylindrical wall) of the vessel 10. The liner 20 can optionally extend substantially to the top end of the vessel 10. The liner 20 can be substantially coextensive with the vessel 10. The liner 20 can extend from an open top end to a closed bottom end with an opening (e.g., a central opening) therethrough. Optionally, the opening in the bottom end of the liner 20 aligns (e.g., has the same width, has the same diameter) as the opening in the bottom end of the vessel 10.

The liner 20 can be made of a material with high thermal conductivity properties. In one example, the liner 20 can be made of aluminum. In another example, the liner 20 is made of another material with high thermal conductivity. The liner 20 defines a chamber sized to receive at least a portion of a metal can (e.g., a soda can, beer can, etc.) 200 therein. The chamber can have a nominal diameter of 65.5 mm+2 mm. However, the chamber can have other suitable dimensions that accommodate a beverage container of a different size.

The cooler can optionally have a thermally conductive slug 30 (the "slug") disposed at a bottom of the chamber. In one example, the slug 30 can have a convex shape facing in the direction of the open end of the vessel 10. In one implementation, the convex shape of the slug 30 substantially matches a concave base of the metal can 200 once inserted into the vessel 10, allowing the slug 30 to substantially contact an entire area of the concave base of the metal can 200, which advantageously facilitates heat transfer between the slug 30 and the metal can 200 (e.g., heat transfer from the metal can 200 to the slug 30 to cool the metal can 200).

In one implementation, the slug 30 is in thermal communication (e.g., in thermal contact, in direct contact) with at least a portion of the liner 20. In one example, the slug 30 and liner 20 are separate components attached together. In another example, the slug 30 and liner 20 are monolithic (e.g., a single piece, manufactured or molded as a single seamless piece). The slug 30 can be made of a material with high thermal conductivity. In one example, the slug 30 is made of the same material as the liner 20. In one example, the slug 30 is made of aluminum.

At least a portion of the slug 30 can at least partially extend through the opening (e.g., the central opening) in the liner 20 and/or the vessel 10. Optionally, the slug 30 substantially seals the opening (e.g., the central opening) in the liner 20 and/or the vessel 10.

A bottom end of the slug 30 can contact a top side of a thermoelectric element (e.g., a Peltier element) 40. In one example, the thermoelectric element 40 contacts the slug 30 but does not contact the liner 20. In another example, the thermoelectric element 40 contacts the slug 30 and the liner 20. In another example, the slug 30 is excluded and the thermoelectric element 40 contacts at least a portion of the liner 20. The thermoelectric element 40 can be multiple thermoelectric elements. The bottom side of the thermoelectric element 40 can optionally contact a heat sink 50. Optionally, the heat sink 50 can have one or more (e.g., a plurality of) fins.

A housing below the vessel 10 can have a cavity that houses at least a portion of the thermoelectric element 40, circuitry, a battery 60 (e.g., multiple batteries, rechargeable batteries), and a fan 70. The housing can have one or more vent openings 80 therein to allow air flow between the cavity and the environment outside the cavity. Optionally, the circuitry can operate the thermoelectric element 40 and/or fan 70 to increase or decrease or maintain a temperature of the metal can and its contents (e.g., a beverage) at a temperature setpoint (e.g., user selected temperature, predetermined temperature) or temperature range. Optionally, the circuitry communicates (e.g., wirelessly) with a remote electronic device (e.g., with a mobile telephone, tablet computer, smartwatch, etc.). For example, the circuitry can receive the temperature setpoint from the remote electronic device and operate the thermoelectric element 40 and/or fan 70 to increase or decrease or maintain a temperature of the metal can and its contents (e.g., a beverage) at the temperature setpoint, as further discussed below.

In operation, a user can insert a metal can 200 (e.g., a soda can, a beer can) into the chamber of the liner 20 so that the outer wall of the metal can 200 is proximate (e.g., adjacent, in contact with) the liner 20 to facilitate thermal communication between the liner 20 and the metal can 200. As discussed above, the metal can 200 can be inserted so that the slug 30 contacts a concave base of the metal can 200. In one implementation, the circuitry operates the thermoelectric element 40 (e.g., automatically operates, for example upon sensing the insertion of the metal can 200 into the chamber of the liner 20) to draw heat from the slug 30 and from the liner 20 (e.g., via the slug 30 that is in thermal contact with the liner 20). The liner 20 and slug 30 draw heat from the metal can 200, which draws heat from its contents (e.g., the beverage) to thereby cool the metal can 200 and/or beverage. Said heat is transferred by the thermoelectric element 40 to the heat sink 50 to dissipate the heat. Optionally, the circuitry operates the fan 70 to draw air past the heat sink 50 to dissipate heat from the heat sink 50. Said air can be drawn through one or more of the vent openings 80 into the cavity and over at least a portion of the heat sink 50 to remove heat from the heat sink and the heated air can be exhausted from the cavity by the fan 70 via one or more of the vent openings 80. Advantageously, the cooler 100 can increase or decrease or maintain a temperature of the metal can 200 for an extended period of time (e.g., 30 min, 1 hour, 2 hours, 3 hours, etc.).

Figure 2:
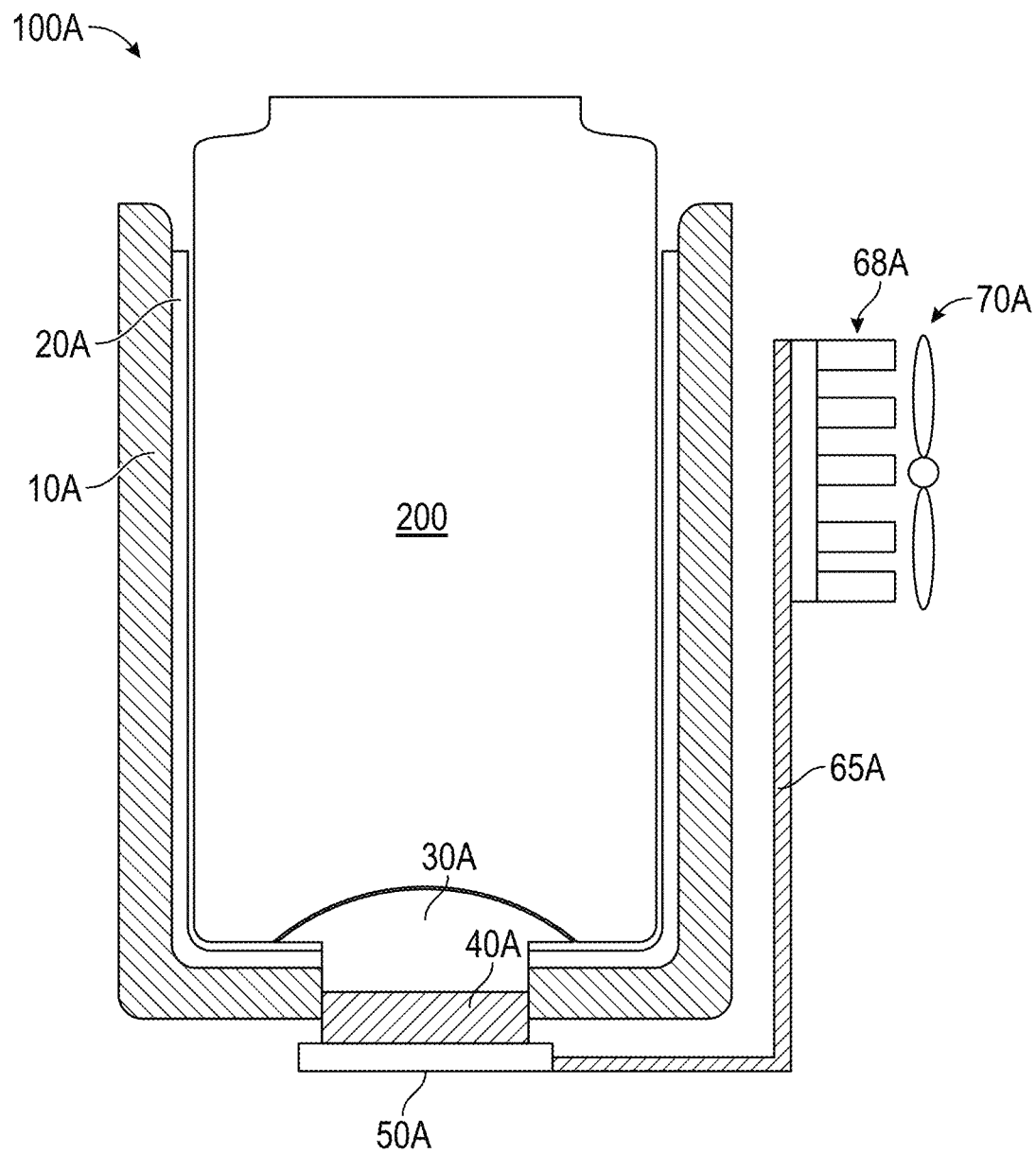
FIG. 2 is a cross-sectional view of another cooler container.

FIG. 2 shows a cross-sectional view of a cooler container assembly 100A (the "cooler"). Some of the features of the cooler 100A are similar to features of the cooler 100 in FIG. 1. Thus, references numerals used to designate the various components of the cooler 100A are identical to those used for identifying the corresponding components of the cooler 100 in FIG. 1, except that an "A" has been added to the numerical identifier. Therefore, the structure and description for the various features of the cooler 100 in FIG. 1 are understood to also apply to the corresponding features of the cooler 100A in FIG. 2, except as described below.

cooler 100A differs from the cooler 100 in that the bottom side of the thermoelectric element 40A is in thermal contact (e.g., direct contact) with a heat transfer block 50A below the thermoelectric element 40A. The heat transfer block 50A can have shape of a plate. However, the heat transfer block 50A can have other form factors. In one implementation, the heat transfer block 50A can be coextensive (e.g., have the same contact area) as the thermoelectric element 40A. In another implementation, the heat transfer block 50A can have a larger area than the thermoelectric element 40A. The heat transfer block 50A can be made of a material with high thermal conductivity (e.g., a metal, such as aluminum, copper, etc.). In another implementation, the heat transfer block 50A can have a phase change material (PCM) encased inside an enclosure to dampen thermal fluctuations due to the operation of the thermoelectric element 40A.

The cooler 100A optionally has a heat pipe 65A in thermal communication (e.g. in thermal contact, in direct contact) with at least a portion of the heat transfer block 50A at one portion of the heat pipe 65A. In one implementation, the heat pipe 65A and heat transfer block 50A are separate components attached together. In another implementation, the heat pipe 65A and the heat transfer block 50A are a single piece (e.g., monolithic, molded or manufactured as a single seamless piece). The heat transfer pipe 65A can be made of a material with high thermal conductivity (e.g., a metal, such as aluminum, copper, etc.). In another implementation, the heat transfer pipe 65A can be a hollow heat pipe with an internal wicking structure and heat transfer fluid for rapid heat transfer. The heat pipe 65A is optionally in thermal communication (e.g., in thermal contact, in direct contact) with at least a portion of a heat sink 68A at another portion of the heat pipe 65A. The heat sink 68A optionally has one or more fins. In one implementation, the heat transfer block 50A, heat pipe 65A and heat sink 68A can be a single structure (e.g., monolithic, single seamless piece). In another implementation, the heat transfer block 50A, heat pipe 65A and heat sink 68A can be separate components in thermal communication (e.g., in thermal contact, in direct contact) with each other. The cooler 100A can have a fan 70A proximate at least a portion of the heat sink 68A (e.g., proximate the fins).

As shown in FIG. 2, the heat pipe 65A can extend generally parallel to, but spaced from, at least a portion of a bottom surface of the vessel 10A and at least a portion of an outer side surface of the vessel 10. However, the heat pipe 65A can be located in other positions along a bottom and/or side surface of the vessel 10. Though not shown, the container 100A can have an outer enclosure or vessel disposed about the vessel 10 and the heat pipe 65A, heat sink 68A and fan 70A. The outer enclosure can define a housing and cavity under the vessel 10 that can house electronics (e.g., circuitry, batteries, sensors, etc.) of the container 100A.

In operation, a user can insert a metal can 200 (e.g., a soda can, a beer can) into the chamber of the liner 20A of the container 100A so that the outer wall of the metal can 200 is proximate (e.g., adjacent, in contact with) the liner 20A to facilitate thermal communication between the liner 20A and the metal can 200. As discussed above, the metal can 200 can be inserted so that the slug 30A contacts a concave base of the metal can 200. In one implementation, the circuitry operates the thermoelectric element 40A (e.g., automatically operates, for example upon sensing the insertion of the metal can 200 into the chamber of the liner 20A) to draw heat from the slug 30A and from the liner 20A (e.g., via the slug 30A that is in thermal contact with the liner 20A). The liner 20A and slug 30A draw heat from the metal can 200, which draws heat from its contents (e.g., the beverage) to thereby cool the metal can 200 and/or beverage. Said heat is transferred by the thermoelectric element 40A to the heat transfer block 50A, which transfers the heat to the heat pipe 65A. The heat pipe 65A communicates said heat to the heat sink 68A to dissipate the heat. Optionally, the circuitry operates the fan 70A to draw air past the heat sink 68A to dissipate heat from the heat sink 68A. Though not shown, said air can be drawn through one or more of the vent openings in an outer enclosure of the container 100A and over at least a portion of the heat sink 68A to remove heat from the heat sink 68A and the heated air can be exhausted from the enclosure by the fan 70A via one or more vent openings. Advantageously, the cooler 100A can increase or decrease or maintain a temperature of the metal can 200 for an extended period of time (e.g., 30 min, 1 hour, 2 hours, 3 hours, etc.).

Figure 3:
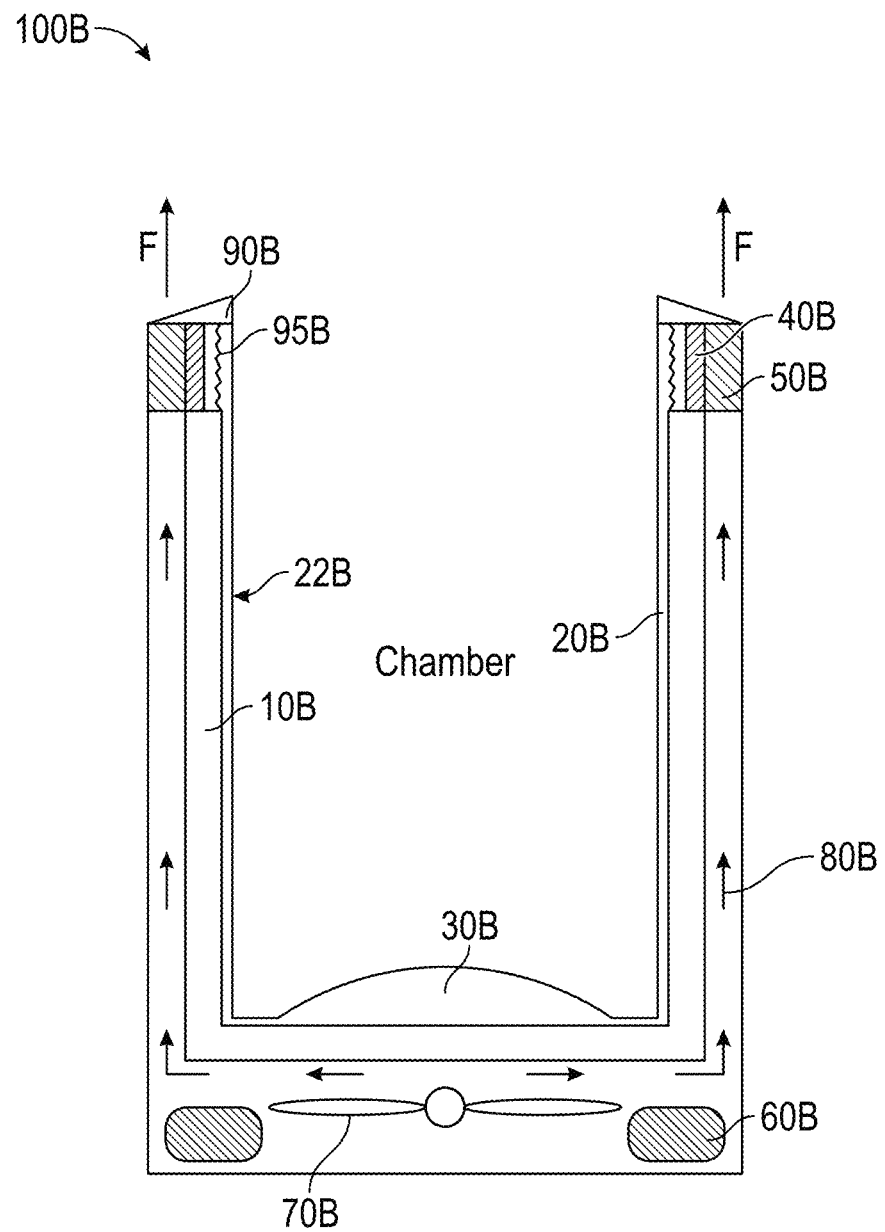
FIG. 3 is a cross-sectional view of another cooler container.

FIG. 3 shows a cross-sectional view of a cooler container assembly 100B (the "cooler"). Some of the features of the cooler 100B are similar to features of the cooler 100 in FIG. 1. Thus, references numerals used to designate the various components of the cooler 100B are identical to those used for identifying the corresponding components of the cooler 100 in FIG. 1, except that a "B" has been added to the numerical identifier. Therefore, the structure and description for the various features of the cooler 100 in FIG. 1 are understood to also apply to the corresponding features of the cooler 100B in FIG. 3, except as described below.

The cooler 100B differs from the cooler 100 in that the thermoelectric element 40B and heat sink 50B are in a ring at the top of the container 100B. The ring can be removably attached to the top of the container 100B (e.g., the ring can have a threaded portion 90B that threadably engages a threaded portion 95B of the container 100B. The threaded portion 95B can optionally be defined by one or more surfaces of the liner 20B.

The container 100B can have an outer housing that defines the cavity under the vessel 10B that houses the fan 70B, one or more batteries 60B and other electronics (e.g., circuitry, sensors, etc.). The outer housing can define a gap between the outer surface of the vessel 10B and the outer surface of the outer housing, the gap providing an air flow path 80B toward a top of the container 100B.

When the ring is attached to the top of the container 100B, one side of the thermoelectric element 40B can be in thermal communication (e.g., in thermal contact, in direct contact) with at least a portion of the liner 20B (e.g., via the threaded connection 90B, 95B). The heat sink 50B can be in thermal communication (e.g., in thermal contact, in direct contact) with an opposite side of the thermoelectric element 40B. Though not shown, the thermoelectric element 40B can be powered via electrical contacts between the ring and top of the container 100B that contact each other. The electrical contacts in the top of the container can optionally connect with the circuitry and/or batteries 60B below the vessel 10B via one or more electrical lines.

In operation, a user can insert a metal can 200 (e.g., a soda can, a beer can) into the chamber of the liner 20B of the container 100B so that the outer wall of the metal can 200 is proximate (e.g., adjacent, in contact with) the inner surface 22B of the liner 20B to facilitate thermal communication between the liner 20B and the metal can 200. As discussed above, the metal can 200 can be inserted so that the slug 30B contacts a concave base of the metal can 200. The ring can be attached to the top of the container 100B before or after the can 200 is inserted into the chamber. In one implementation, the circuitry operates the thermoelectric element 40B (e.g., automatically operates, for example upon sensing the insertion of the metal can 200 into the chamber of the liner 20B) to draw heat from the liner 20B (and from the slug 30B via the liner 20B). The liner 20B and slug 30B draw heat from the metal can 200, which draws heat from its contents (e.g., the beverage) to thereby cool the metal can 200 and/or beverage. Said heat is transferred by the thermoelectric element 40B to the heat sink 50B. Optionally, the circuitry operates the fan 70B to draw air via one or more vent openings in the outer housing of the container 100B and flows said air along the air flow path 80B toward the top of the container 100B. The air flows past at least a portion of the heat sink 50B to dissipate heat from the heat sink 50B and flows out of one or more exhaust openings in the container 100B. In one implementation, the exhaust openings are defined at the top of the container 100B as shown in FIG. 3. However, in other implementations, the exhaust openings can be in other locations of the container 100B. Advantageously, the cooler 100B can increase or decrease or maintain a temperature of the metal can 200 for an extended period of time (e.g., 30 min, 1 hour, 2 hours, 3 hours, etc.).

With reference to the container 100, 100A, 100B, the circuitry can optionally operate the thermoelectric element 40, 40A, 40B to cool the metal can 200 and/or the beverage in it to a desired temperature (e.g., temperature setpoint). In one implementation, the desired temperature is a predetermined temperature (e.g., stored in a memory in the container 100, 100A, 100B that communicates with the circuitry). In another implementation, the desired temperature is a user selected temperature. Optionally, the user selected temperature can be provided by the user manually via a user interface on the container 100, 100A, 100B. In another implementation, the user selected temperature can be provided by the user wirelessly via a remote electronic device, as further discussed below. Optionally, the container 100, 100A, 100B can have one or more sensors that communicate with the circuitry, the circuitry operating one or both of the thermoelectric element 40, 40A, 40B, 40D and fan 70, 70A, 70B based at least in part on the sensed information provided by the one or more sensors. The sensors can include a temperature sensors to sense a temperature of the liner 20, 20A, 20B and/or slug 30, 30A, 30B and/or the beverage container 200 and/or ambient environment. The sensors can include a pressure sensor, contact sensor, proximity sensor, load sensor, or other suitable sensor to sense a presence of the metal container (e.g., metal can) in the chamber of the container 100, 100A, 100B.

The batteries 60, 60B can be rechargeable batteries. In one implementation, the batteries 60, 60B can be recharged by placing the container 100, 100A, 100B on a power base (not shown). In one implementation, the container 100, 100A, 100B can have electrical contacts on a bottom thereof that contact electrical contacts on the power base to thereby transfer power from the power base to the batteries 60, 60B. In another implementation, the batteries 60, 60B can be recharged wirelessly via inductive coupling when the container 100, 100A, 100B is placed on the base (e.g., the circuitry of the container 100, 100A, 100B can have a wireless power receiver that receives power from a wireless power transmitter in the power base). In another implementation, the cooler container assembly 100, 100A, 100B can have a connector to which a power cable can be connected, the other end of the power cable connectable to a power source (e.g., to a wall socket, etc.). In one implementation, the batteries 60, 60B can be in a removable pack, allowing the batteries 60, 60B to be swapped out with another pack and/or to be recharged, thereby allowing the cooler container 100, 100A, 100B to have extended temperature control performance.

Figure 5:
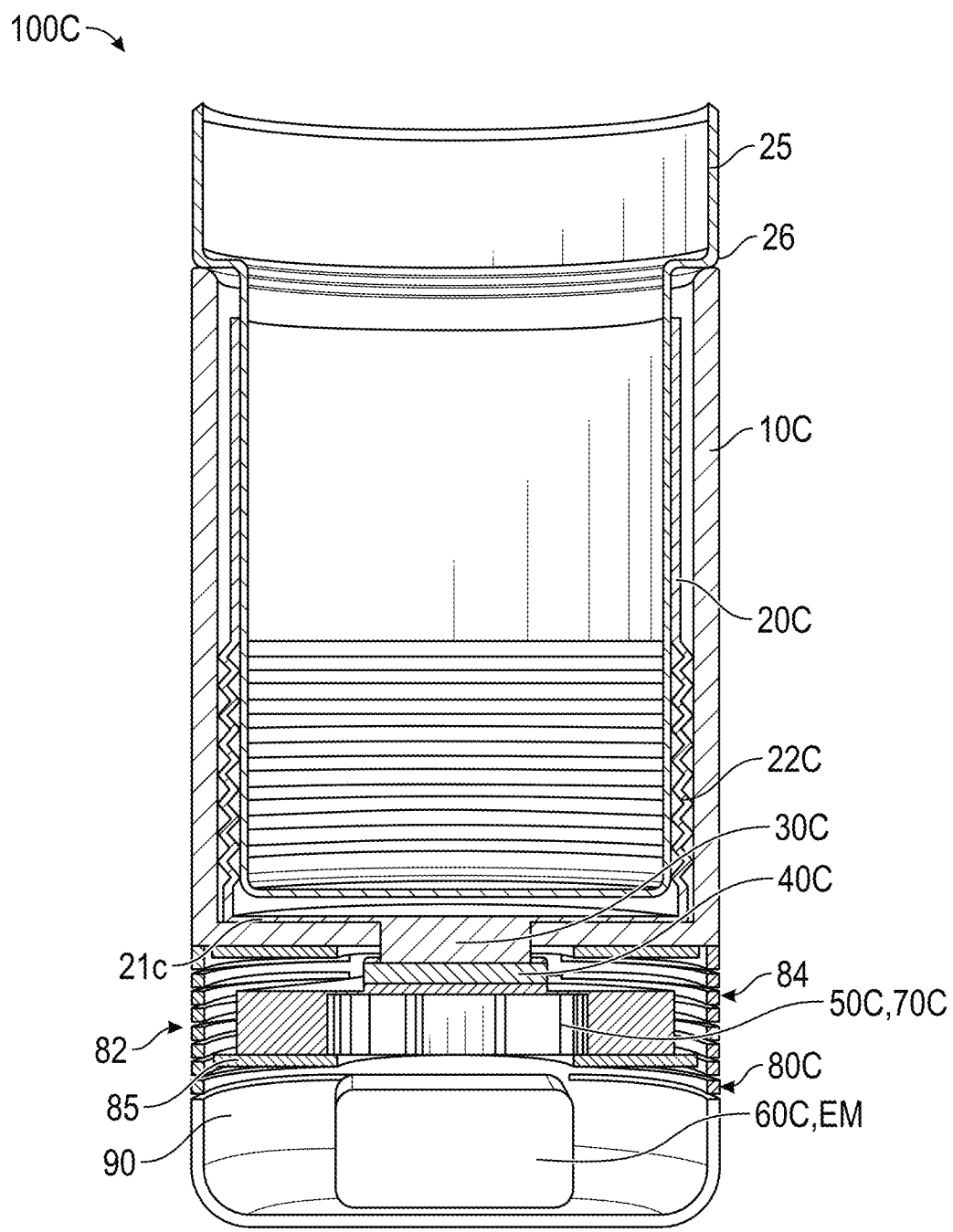
FIG. 5 is a cross-sectional view of a cooler container.

FIG. 5 shows a cross-sectional view of a cooler container assembly 100C (the "cooler"). Some of the features of the cooler 100C are similar to features of the cooler 100 in FIG. 1. Thus, references numerals used to designate the various components of the cooler 100C are identical to those used for identifying the corresponding components of the cooler 100 in FIG. 1, except that an "C" has been added to the numerical identifier. Therefore, the structure and description for the various features of the cooler 100 in FIG. 1 are understood to also apply to the corresponding features of the cooler 100C in FIG. 5, except as described below.

The cooler 100C can include an insulated cylindrical vessel 10C (e.g., an outer vessel) with an open top end and a closed bottom end with an opening (e.g., a central opening) therethrough. In one implementation, the vessel 10C can be double walled with an outer peripheral wall (e.g., an outer cylindrical wall) spaced apart by a gap from an inner peripheral wall (e.g., an inner cylindrical wall). In one example, the gap can be filled with air. In another example, the gap can be filled with an insulating material (e.g., foam). In another example, the gap can be under a vacuum. Advantageously, the inner peripheral wall is insulated from the outer peripheral wall (e.g., so that heat from a user's hand holding the cooler 100C is not transferred to the inner peripheral wall to inhibit heat transfer between the inner and outer peripheral walls. In another implantation, the vessel 10C can be single walled. In one implementation, the vessel 10C is made of a thermally insulative material (e.g., plastic, other polymer material, other non-metallic material).

The vessel 10C defines a chamber therein and an inner peripheral liner 20C (the "liner") can be disposed in thermal communication with (e.g., in thermal contact with, in direct contact with) the inner peripheral wall of the vessel 10C. The liner 20C can optionally extend substantially to the top end of the vessel 10C (e.g., to just below the top end, such as 70% or 80% or 90%, of the height of the inner peripheral wall, or heights therebetween). The liner 20C can be substantially coextensive with the vessel 10C. The liner 20C can extend from an open top end to a closed bottom end 21C. At least a portion of the liner wall 22C of the liner 20C can have a ribbed shape.

The liner 20C can be made of a material with high thermal conductivity properties. In one example, the liner 20C can be made of aluminum. In another example, the liner 20C is made of another material with high thermal conductivity. The liner 20C defines a chamber sized to receive at least a portion of beverage container 25. The beverage container 25 can be in thermal communication with (e.g., in thermal contact with, in direct contact with) at least a portion of the inner peripheral surface of the liner 20C. The beverage container 25 can be made of glass. However, the beverage container 25 can be made of another suitable material. In one implementation, the beverage container 25 can protrude from the top end of the vessel 10C and liner 20C. In one implementation, the beverage container 25 can have a lip or shoulder 26 that can be disposed over a rim of the vessel 10C (e.g., so that a top end wall of the beverage container 25 substantially aligns with the wall of the vessel 10C). In one implementation, the beverage container 25 can be removable from within the vessel 10C, for example, so that it can be washed. In another implementation, the beverage container 25 is not removable from the liner 20C.

The cooler 100C can optionally have a thermally conductive slug 30C (the "slug") that extends through an opening (e.g., central opening) in a bottom of the vessel 10C and is in thermal communication with (e.g., in thermal contact with, in direct contact with) the liner 20C. In one implementation, the slug 30C is in thermal communication (e.g., in thermal contact, in direct contact) with at least a portion of the liner 20C. In one example, the slug 30C and liner 20C are separate components attached together. In another example, the slug 30C and liner 20C are monolithic (e.g., a single piece, manufactured or molded as a single seamless piece). The slug 30C can be made of a material with high thermal conductivity. In one example, the slug 30C is made of the same material as the liner 20C. In one example, the slug 30C is made of aluminum.

At least a portion of the slug 30C can at least partially extend through the opening (e.g., the central opening) in the vessel 10C. Optionally, the slug 30C substantially seals the opening (e.g., the central opening) in the vessel 10C.

A bottom end of the slug 30C can contact a top side of a thermoelectric element (e.g., a Peltier element) 40C. In one example, the thermoelectric element 40C contacts the slug 30C but does not contact the liner 20C. In another example, the slug 30C is excluded and the thermoelectric element 40C contacts at least a portion of the liner 20C. The thermoelectric element 40C can be multiple thermoelectric elements. The bottom side of the thermoelectric element 40C can optionally contact a heat sink 50C. Optionally, the heat sink 50C can have one or more (e.g., a plurality of) fins.

A housing below the vessel 10 can have a cavity 90 that houses at least a portion of the thermoelectric element 40C, circuitry EM, a battery 60C (e.g., multiple batteries, rechargeable batteries), and a fan 70C. The housing can have one or more vent openings 80C therein, including intake openings 82 and exhaust openings 84 (e.g., separated by divider, such as flat structure 85) to allow air flow between the cavity 90 and the environment outside the cavity. Optionally, the circuitry EM can operate the thermoelectric element 40C and/or fan 70C to increase or decrease or maintain a temperature of the beverage container 25 and its contents (e.g., a beverage) at a temperature setpoint (e.g., user selected temperature, predetermined temperature) or temperature range. Optionally, the circuitry EM communicates (e.g., wirelessly) with a remote electronic device (e.g., with a mobile telephone, tablet computer, smartwatch, etc.). For example, the circuitry EM can receive the temperature setpoint from the remote electronic device and operate the thermoelectric element 40C and/or fan 70C to increase or decrease or maintain a temperature of the beverage container 25 and its contents (e.g., a beverage) at the temperature setpoint, as further discussed below.

In operation, a user can pour a beverage into the beverage container 25. If the beverage container 25 is removable, the user can pour said beverage therein before or after the container 25 is inserted into the vessel 10C so that it is in thermal communication with the liner 20C. In one implementation, the circuitry operates the thermoelectric element 40C (e.g., automatically operates, for example upon sensing the insertion of the beverage container 25 into the chamber of the liner 20C) to draw heat from the slug 30C and from the liner 20C (e.g., via the slug 30C that is in thermal contact with the liner 20C). The liner 20C and slug 30C draw heat from the beverage container 25, which draws heat from its contents (e.g., the beverage) to thereby cool the beverage container 25 and/or beverage. Said heat is transferred by the thermoelectric element 40C to the heat sink 50C to dissipate the heat. Optionally, the circuitry operates the fan 70C to draw air past the heat sink 50C to dissipate heat from the heat sink 50C. Said air can be drawn through one or more intake openings 82 into the cavity 90 and over at least a portion of the heat sink 50C to remove heat from the heat sink and the heated air can be exhausted from the cavity 90 by the fan 70 via one or more exhaust openings 84. Advantageously, the cooler 100C can increase or decrease or maintain a temperature of the beverage container 25 for an extended period of time (e.g., 30 min, 1 hour, 2 hours, 3 hours, etc.).

The ribbed portion 22C of the liner 20C provides a longer thermal bridge (e.g., path) from the (e.g., cold) slug 30C to the primary thermal interface between the liner 20C and a beverage container 25 (e.g., near the top middle of the container 25). When the thermoelectric element 40C is inactive, this longer path inhibits (e.g., prevents) heating of the beverage as the cold side of the thermoelectric element 40C slowly starts warming over time. Therefore, the ribbed portion 22C of the liner 20C facilitates maintaining cold beverage temperatures longer in the beverage container 25.

Figure 6:
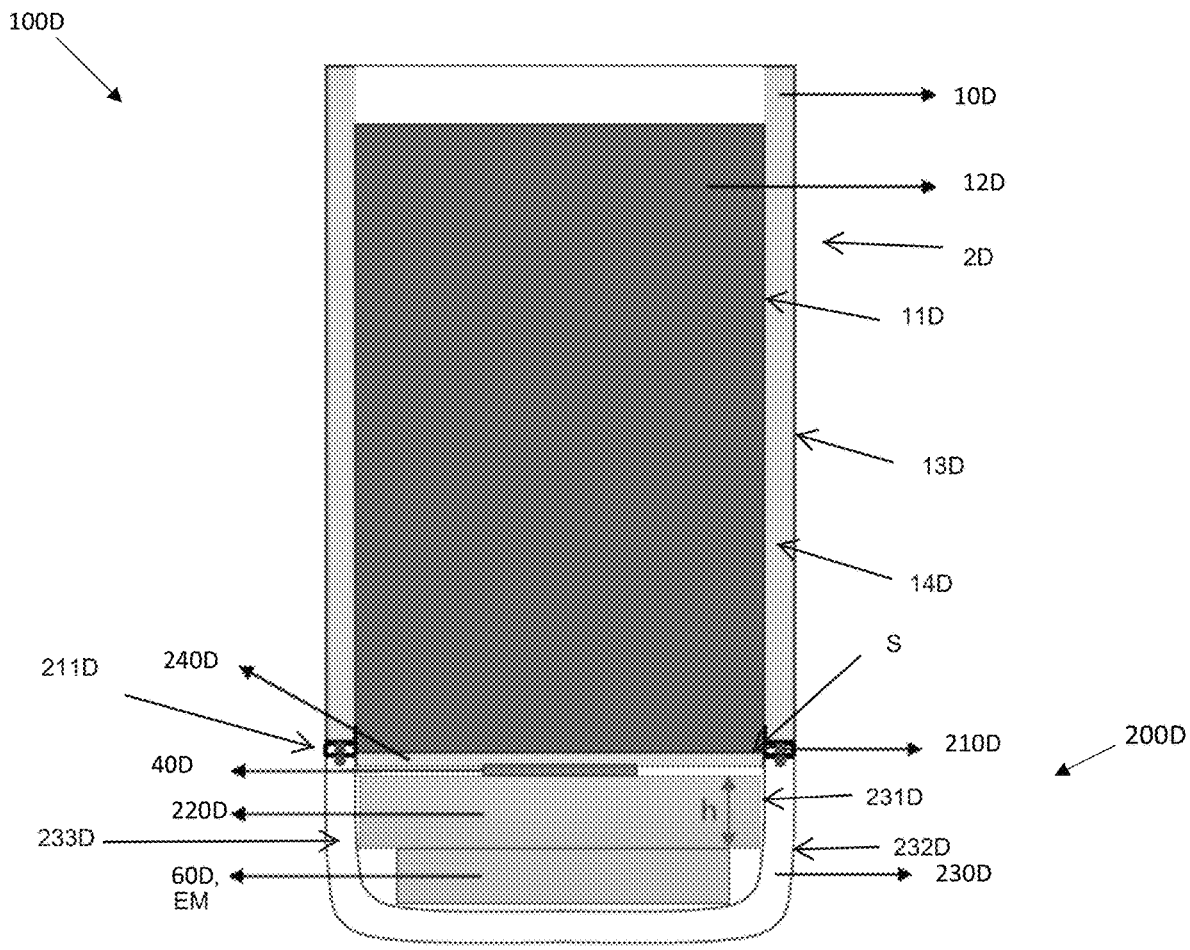
FIG. 6 is a schematic cross-sectional view of a beverage container and cooling unit.

FIG. 6 shows a cross-sectional view of a beverage container assembly 100D (the "container" or "beverage container"). Some of the features of the container 100D are similar to features of the container 100 in FIG. 1. Thus, references numerals used to designate the various components of the container 100D are identical to those used for identifying the corresponding components of the container 100 in FIG. 1, except that an "D" has been added to the numerical identifier. Therefore, the structure and description for the various features of the container 100 in FIG. 1 are understood to also apply to the corresponding features of the container 100D in FIG. 6, except as described below.

The container 100D has an insulated cylindrical vessel 10D that has a chamber 12D. In one implementation, the vessel 10D is insulated with an insulating material in the wall 2D of the vessel 10D. In another implementation, the vessel 10D is insulated via a vacuum in the wall 2D of the vessel 10D; for example, the wall of the vessel 10D can be a double-walled structure with an inner wall 11D spaced from an outer wall 13D by a gap 14D, the gap 14D being under vacuum. In another implementation, the gap 14D is not under vacuum and is instead filled with an insulating material (e.g., foam). In one implementation, the insulated vessel 10D can be made of glass. In another implementation, the vessel 10D can be made of metal (e.g., titanium, aluminum) or a plastic. In another implementation, the wall 2D can be a single wall (i.e., not double-walled structure) of a thickness that inhibits heat transfer through the wall 2D (e.g., the wall 2D has an R value above a threshold).

The container 100D includes a cooling or heating unit 200D (e.g., a cooling unit 200D). In one implementation, the cooling unit 200D can be detachable from the vessel 10D. In one example, the cooling unit 200D can removably couple to the bottom end of the vessel 10D via a coupling mechanism 210D. In one embodiment, the coupling mechanism 210D includes one or more magnets 211D (e.g., on one or both of the vessel 10D and the cooling unit 200D) that allow the cooling unit 200D to magnetically couple to the bottom end of the vessel 10D. In other implementations, the coupling mechanism 210D can be other suitable mechanisms (e.g., a key-slot mechanism, a threaded mechanism, a press-fit mechanism, etc.).

The cooling or heating unit 200D includes a base 240D. In one implementation, the base 240D can be made of glass. In another implementation, the base 240D can be made of metal (e.g., titanium, aluminum) or a plastic. In one implementation, the vessel 10D is open at both ends and when the vessel 10D is coupled to the cooling unit 200D, the base 240D defines the bottom of the chamber 12D. In another implementation, the vessel 10D is closed (e.g., has a base) at the bottom end of the vessel 10D, and when the vessel 10D is coupled to the cooling unit 200D, the base 240D operatively or directly contacts the base of the vessel 10D.

The cooling or heating unit 200D can include the base 240D, a thermoelectric element 40D (e.g., one or more Peltier elements, multiple Peltier elements) in contact with a surface of the base 240D, a module 220D of thermal mass (with thermal capacity) or phase change material (PCM) in thermal communication (e.g., thermal contact, direct contact) with the thermoelectric element 40D, and a power storage device 60D (e.g., one or more power storage devices, one or more batteries, one or more rechargeable batteries) and circuitry EM. With continued reference to FIG. 6, the circuitry EM, power storage device 60D, module 220D of thermal mass or PCM and thermoelectric element 40D are disposed in a cavity of a bottom cap or cover 230D, where the base 240D defines an end of the cooling unit 200D. In one implementation, the module 220D of thermal mass or PCM can have a melting temperature close to the expected bulk fluid temperature of expected fluid used with the liquid or beverage (e.g., a melting temperature of between about 5-6° C., or about 5.5° C.). In one implementation, the PCM of the module 220D can be a solid-to-liquid PCM. In another implementation, the PCM of the module 220D can be a solid-to-solid PCM.

In one implementation, at least a portion of the cover 230D can be insulated. In one example, the cover 230D can be made metal (e.g., titanium, aluminum) or a plastic. In one example, the cover 230D can be a single wall. In another implementation, the cover 230D can be a double-walled structure with an inner wall 231D spaced from an outer wall 232D by a gap 233D, the gap 233D being under vacuum. In another implementation, the gap 233D is not under vacuum and is instead filled with an insulating material (e.g., foam). In another implementation, the cover 230D can be a single wall (i.e., not double-walled structure) of a thickness that inhibits heat transfer through the cover 230D (e.g., the cover 230D has an R value above a threshold).

Optionally, the container 100D can have one or more sensors S that communicate with the circuitry EM, the circuitry EM operating one or both of the thermoelectric element 40D based at least in part on the sensed information provided by the one or more sensors S. In one implementation, the one or more sensors S can be proximate the base 240D. The sensors S can include a temperature sensors to sense a temperature of the liquid in the chamber 12D. The sensors S can include a pressure sensor, a contact sensor, a proximity sensor, a load sensor, or other suitable sensor to sense a presence of the liquid in the chamber 12D of the container 100D.

In operation, when the cooling or heating unit 200D is operated as a cooling unit, the thermoelectric element 40D is operated (e.g., by the circuitry EM, via power from the power storage device 60D) to draw heat from the liquid in the chamber 12D through the base 240D (e.g., which acts as a cold-side heat sink) and transfers it to the module 220D of thermal mass or phase change material, which absorbs the heat (e.g., by changing from a solid to a liquid material, or by changing from one solid to another solid material). Advantageously, this allows the cooling unit 200D to cool the liquid (e.g., a beverage) in the vessel 10D (e.g., by between 2-3° C.). In one example, the cooling unit 200D can cool a liquid poured into the chamber 12D at a temperature of 8° C. to a temperature of about 6° C. Beverages at a temperature between 2° C. (e.g., cold coffee, iced tea, beer) to 18° C. (e.g., red wine), when poured into the chamber 12D, can cooled by about 2-3° C. (e.g., cooled to a temperature about 2-3° C. below the temperature of the poured liquid). In one implementation, where the cooling unit 200D is being used to maintain the liquid (e.g., beverage) in the chamber 12D at the temperature the liquid is poured at, the module 220D of the cooling unit 200D can advantageously maintain the liquid in the cooled state for a period of about 2 hours at an ambient temperature of 25° C. or for a period of about 1 hour at an ambient temperature of 35° C. In another implementation, where the cooling unit 200D is being used to cool the liquid (e.g., beverage) in the chamber 12D to a temperature 3° C. below the temperature the liquid is poured at, the module 220D of the cooling unit 200D can advantageously cool the liquid by the 3° C. and maintain it in the cooled state for a period of about 1.3 hours at an ambient temperature of 25° C. or for a period of about 0.75 hour at an ambient temperature of 35° C.

In operation, when the cooling or heating unit 200D is operated as a heating unit, the thermoelectric element 40D is operated (e.g., by the circuitry EM, via power from the power storage device 60D) to draw heat from the module 220D of thermal mass or PCM and transfer it to the liquid in the chamber 12D through the base 240D (e.g., which acts as a hot-side heat sink), so that the module 220D of thermal mass or PCM releases heat (e.g., by changing from a liquid to a solid material, or by changing from one solid to another solid material). Advantageously, this allows the heating unit to heat the liquid (e.g., a beverage) in the vessel 10D.

Figure 7:
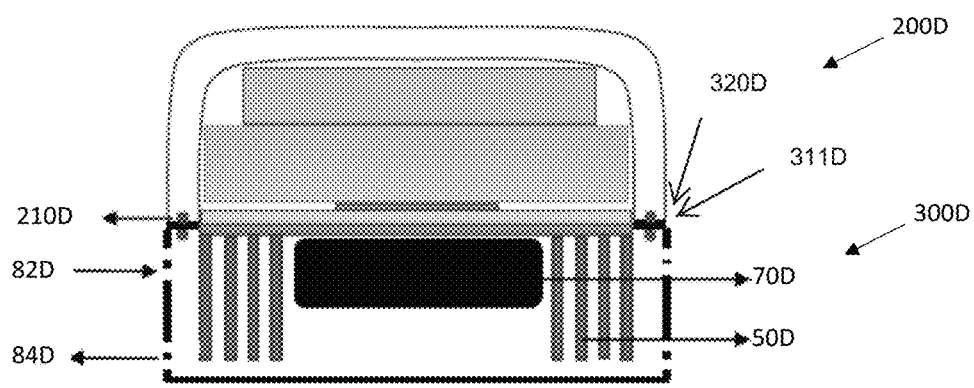
FIG. 7 is a schematic cross-sectional view of the cooling unit of FIG. 6 disposed on a charging module.

FIG. 7 shows the cooling unit 200D detached from the vessel 10D and removably coupled to a charging module 300D via the coupling mechanism 210D (e.g., such as one or more magnets 211D of the cooling or heating unit 200D). In one implementation, the charging module 300D optionally has one or more magnets 311D that can engage with magnets 211D of the coupling mechanism 210D. The charging module 300D can have a heat sink 50D and a fan 70D that draws air into the charging module 300D via one or more intake openings 82D and exhausts air from the charging module 300D via one or more exhaust openings 84D. the charging module 300D can have a power source (e.g., one or more batteries) or be connected to a power source (e.g. wall power), and electrical contacts 320D between the charging module 300D and the cooling unit 200D can transfer power from the power source to the one or more power storage devices 60D (e.g., one or more batteries). When the cooling unit 200D is coupled to the charging module 300D, the power source can supply power to the power storage device(s) 60D to charge them and/or the circuitry EM can operate the thermoelectric element 40D to draw heat from the module 220D to charge the thermal mass or PCM (e.g., to allow the thermal mass or to absorb heat) and transfers said heat to the heat sink 50D. The fan 70D is operated to dissipate heat from the heat sink 50D to allow further heat to be removed (by the thermoelectric element 40D) from the module 220D.

Advantageously, the module 220D of thermal mass or PCM of the multiple cooling units 200D can be charged with the charging module 300D to provide digital ice cubes that can be connected (e.g., one after the other, if desired) to the same vessel 10D to maintain the liquid or beverage in the vessel 10D in a cooled state for a prolonged period of time. A user can therefore swap one cooling unit 200D attached to the vessel 10D, whose module 220D or power storage device 60D has been depleted, with another cooling unit 200D (e.g., to continue cooling the liquid or beverage in the vessel 10D).

In another implementation, the cooling unit 200D and the vessel 10D are a single piece (e.g., the cooling unit 200D is not detachable). In such an implementation, the module 220D of thermal mass or PCM can be charged on a stand, as further discussed below. Though the unit 200D is described above as a cooling unit, one of skill in the art will recognize it can also be operated as a heating unit by operating the thermoelectric element 40D with opposite polarity, and can therefore be a heating or cooling unit.

Figure 8:
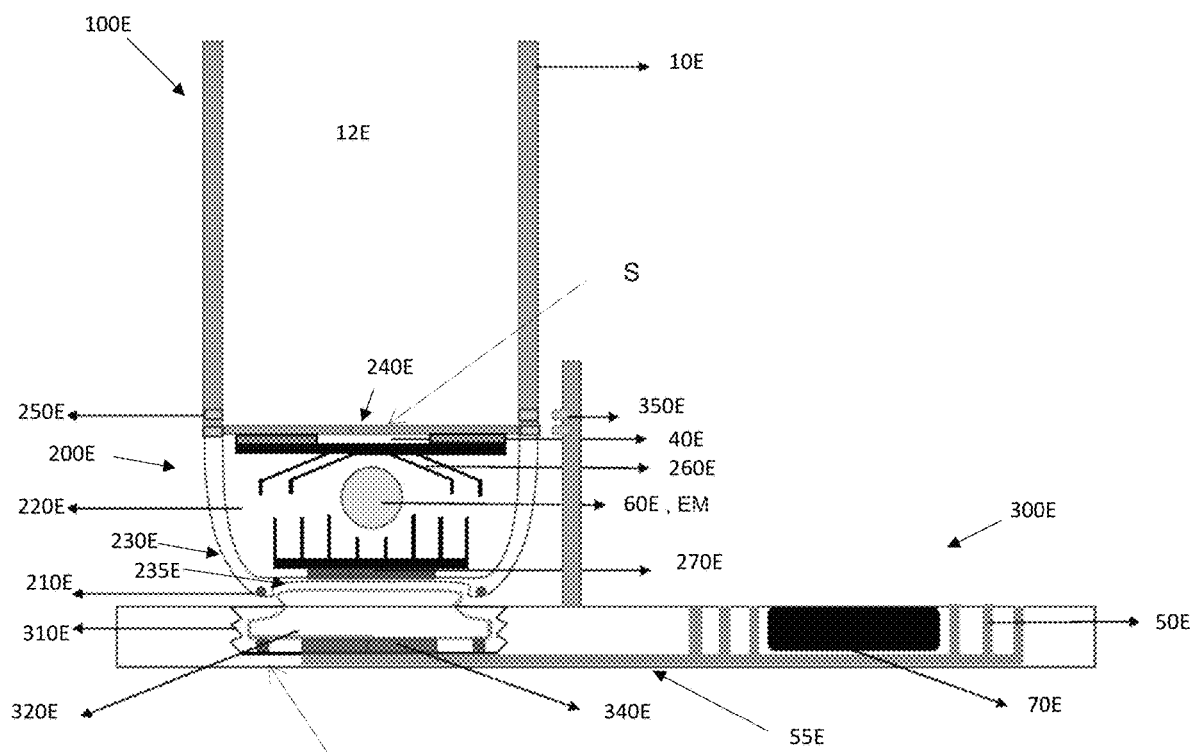
FIG. 8 is a schematic cross-sectional view of a beverage container and cooling unit disposed on a charging module.

FIG. 8 shows a schematic cross-sectional view of a container 100E, cooling unit 200E and charging module 300E. Some of the features of the container 100E, cooling unit 200E and charging module 300E are similar to features of the container 100D, cooling unit 200D and charging module 300D in FIGS. 6-7. Thus, references numerals used to designate the various components of the container 100E, cooling unit 200E and charging module 300E are identical to those used for identifying the corresponding components of the container 100D, cooling unit 200D and charging module 300D in FIGS. 6-7, except that an "E" rather than a "D" has been added to the numerical identifier. Therefore, the structure and description for the various features of the container 100D, cooling unit 200D and charging module 300D in FIGS. 6-7, which are based on the features of the container (e.g., cooler) 100 in FIG. 1, are understood to also apply to the corresponding features of the container 100E, cooling unit 200E and charging module 300E in FIG. 8, except as described below. Though not shown in FIG. 8, the charging module 300E can have a power source (e.g., electrical connector to wall power, one or more power storage devices, such as batteries, rechargeable batteries, etc.).

The container 100E has a vessel 10E that has a chamber 12E, which can have the same structure as the vessel 10D (e.g., be an insulated vessel, be single walled of a thickness or R value that inhibits heat transfer through the wall, be double walled with a gap that is under vacuum or filled with an insulating material). The cooling unit 200E can be integral with the vessel 10E (e.g., the cooling unit 200E is not detachable from the vessel 10E). The cooling unit 200E has a base 240E that in one implementation defines the bottom of the chamber 12E. In another implementation, the vessel 10E is closed (e.g., has a base) at the bottom end of the vessel 10E and the base 240E of the cooling unit 200E operatively or directly contacts the base of the vessel 10E.

The cooling unit 200E has a thermoelectric element 40E (e.g., one or more Peltier elements, multiple Peltier elements) in contact with a surface of the base 240E. In one implementation, the thermoelectric element 40E is ring-shaped (as shown in FIG. 8) and can effect heat transfer through the base 240E, but a portion of the base 240E aligned with an open space of the ring-shaped thermoelectric element 40E is not heated (e.g., directly heated) by the thermoelectric element 40E. In one implementation, the ring-shaped thermoelectric element 40E facilitates recirculation of liquid in the chamber 12E (e.g., by allowing the formation of a plume due to the differential in temperature in locations of the base 240E adjacent the thermoelectric element 40E with respect to the location of the base 240E not adjacent the thermoelectric element 40E), which can advantageously inhibit (e.g., prevent) temperature stratification of the liquid (e.g., beverage) in the chamber 12E of the vessel 10E and facilitate substantially uniform cooling of the liquid in the chamber 12E.

The cooling unit 200E also includes a heat spreader 260E in thermal communication with the thermoelectric element 40E, a power storage device 60E (e.g., one or more power storage devices, one or more batteries, one or more rechargeable batteries) and circuitry EM. The cooling unit 200E also includes a second heat spreader 270E and a module 230E of thermal mass or PCM that is in thermal contact with the heat spreader 260E and the second heat spreader 270E.

With continued reference to FIG. 8, the circuitry EM, power storage device 60E, module 220E of thermal mass or PCM, heat spreader 260E, second heat spreader 270E and thermoelectric element 40E are disposed in a cavity of a bottom cap or cover 230E, where the base 240E defines an end of the cooling unit 200E. In one implementation, at least a portion of the cover 230E can be insulated. In one example, the cover 230E can be made metal (e.g., titanium, aluminum) or a plastic. In one example, the cover 230E can be a single wall. In another implementation, at least a portion of the cover 230E can be a double-walled structure with an inner wall spaced from an outer wall by a gap, the gap being under vacuum (e.g., similar to the cover 230D). In another implementation, the gap is not under vacuum and is instead filled with an insulating material (e.g., foam). In another implementation, the cover 230E can be a single wall (i.e., not double-walled structure) of a thickness that inhibits heat transfer through the cover 230E (e.g., the cover 230E has an R value above a threshold). The cover 230E has a recessed wall 235E, spaced from a bottom of the cover 230E to inhibit (e.g., prevent) the recessed wall 235E from contacting a surface (e.g., table, counter) when the container 100E is placed thereon, advantageously inhibiting (e.g., preventing) heat transfer through the recessed wall 235E to inhibit (e.g., prevent) the module 220E of thermal mass or PCM from discharging (e.g., melting) due to heat transfer through the recessed wall 235E. As shown in FIG. 8, the second heat spreader 270E can be in thermal communication with the recessed wall 235E. In one implementation, the bottom cap or cover 230E, except for the recessed wall 235E, can be insulated (as described above), allowing heat to be transferred through the recessed wall 235E.

The cooling unit 200E optionally includes one or more magnets 210E, for example in the bottom cap or cover 230E, which allow the container 100E to couple to the charging module 300E, as further described below. The container 100E also includes one or more (e.g., a pair of) electrical contacts 250E via which power can be provided to one or more of the circuitry EM, the power storage device 60 and the thermoelectric element 40E. In one implementation, the electrical contact(s) 250E can extend circumferentially about the vessel 10E (e.g., extend completely around the vessel 10E), allowing the electrical contact(s) 250E to contact electrical contacts 350E of the charging module 300E irrespective of the orientation of the container 100E when placed on the charging module 300E, thereby facilitating (e.g., making simpler or easier) the coupling of the container 100E to the charging module 300E.

Optionally, the container 100E can have one or more sensors S that communicate with the circuitry EM, the circuitry EM operating one or both of the thermoelectric element 40E based at least in part on the sensed information provided by the one or more sensors S. In one implementation, the one or more sensors S can be proximate the base 240E (e.g., located in the center of the ring-shaped thermoelectric element 40E). The sensors S can include a temperature sensors to sense a temperature of the liquid in the chamber 12E. The sensors S can include a pressure sensor, a contact sensor, a proximity sensor, a load sensor, or other suitable sensor to sense a presence of the liquid in the chamber 12E of the container 100E.

With continued reference to FIG. 8, the charging module 300E includes a fan 70E, a heat sink 50E proximate the fan 70E, a heat pipe 55E in thermal communication with the heat sink 50E and with a thermoelectric element 340E (e.g., one or more Peltier elements, multiple Peltier elements). The charging module 300E also includes a thermal mass module 320E in thermal communication with the thermoelectric element 340E. In one implementation, the thermal mass module 320E is a flexible bladder filled with a heat transfer fluid. Optionally, the charging module 300E has a resilient member 310E, such as a bellows or spring, and optionally has one or more magnets 330E.

In one implementation, the user can place the container 100E on the charging module 300E (e.g., coaster, charging coaster) during use, such as between sips of a beverage. When the container 100E is on the charging module 300E, the electrical contacts 250E of the container 100E are in contact with the electrical contacts 350E of the charging module 300E, and the magnets 210E (or magnetic material) of the container 100E and magnets 330E (or magnetic material) of the charging module 300E exert a force (e.g., magnetic force) toward each other that maintains the container 100E on the charging module 300E. Optionally, the force (e.g., magnetic force) can also cause the thermal mass module 320E to extend (e.g., via the resilient member 310E) into and fill the space on the bottom of the bottom cap or cover 230E to contact the recessed wall 235E (e.g., without any air gaps between the thermal mass module 320E and the recessed wall 235E), thereby providing a dynamic thermal interface and good thermal contact between the thermal mass module 320E and the recessed wall 235E.

In operation, while the container 100E is on the charging module 300E, the thermoelectric element 340E can be operated to cool or draw heat from the thermal mass module 320E and direct said heat to the heat sink 50E via the heat pipe 55E, the fan 70E operated to dissipate said heat from the heat sink 50E. The cooled thermal mass module 320E can in turn draw heat (e.g., cool, charge) the module 220E of thermal mass or PCM via the recessed wall 235E and second heat spreader 270. The thermoelectric element 40E can be operated to draw heat from a liquid in the chamber 12E and transfer it to the module 220E of thermal mass or PCM via the heat spreader 260E. Therefore, while the container 100E is on the charging module 300E (e.g., coaster, charging coaster), the module 220E of thermal mass or PCM is absorbing heat from the liquid in the chamber 12E, and heat is being dissipated from the module 220E by the thermal mass module 320E. In one implementation, the thermoelectric element 40E is not operated while the container 100E is on the charging module 300E (only the thermoelectric element 340E in the charging module 300E is operated) and heat passively drawn from the liquid in the chamber 12E via conduction through the base 240E, thermoelectric element 40E (without operating it), the heat spreader 260E, the module 220E of thermal mass or PCM and the second heat spreader 270E. Advantageously, while the container 100E is on the charging module 300E, the cooling unit 200E can maintain the liquid in the chamber 12E of the vessel 10E in a cooled state for a prolonged period of time (e.g., 5-6 hours). Alternatively or additionally, the user can maintain the container 100E on the charging module 300E to allow the charging module 300E to charge (e.g., fully charge) the module 220E of thermal mass or PCM.

In another implementation, when the container 100E is not on the charging module 300E, and the module 220E of thermal mass or PCM is fully charged, the cooling unit 200E can maintain the liquid (e.g., beverage) in the chamber 12E of the vessel 10E in a cooled state. For example, the cooling unit 200E can cool a liquid poured into the chamber 12E at a temperature of 8° C. to a temperature of about 6° C. Beverages at a temperature between 2° C. (e.g., cold coffee, iced tea, beer) to 18° C. (e.g., red wine), when poured into the chamber 12E, can cooled by about 2-3° C. (e.g., cooled to a temperature about 2-3° C. below the temperature of the poured liquid). In one implementation, where the cooling unit 200E is being used to maintain the liquid (e.g., beverage) in the chamber 12E at the temperature the liquid is poured at, the module 220D of the cooling unit 200E can advantageously maintain the liquid in the cooled state for a period of about 2 hours at an ambient temperature of 25° C. or for a period of about 1 hour at an ambient temperature of 35° C. In another implementation, where the cooling unit 200E is being used to cool the liquid (e.g., beverage) in the chamber 12E to a temperature 3° C. below the temperature the liquid is poured at, the module 220E of the cooling unit 200E can advantageously cool the liquid by the 3° C. and maintain it in the cooled state for a period of about 1.3 hours at an ambient temperature of 25° C. or for a period of about 0.75 hour at an ambient temperature of 35° C. Though the unit 200E is described above as a cooling unit, one of skill in the art will recognize it can also be operated as a heating unit by operating the thermoelectric element 40E with opposite polarity, and can therefore be a heating or cooling unit.

Figure 9:
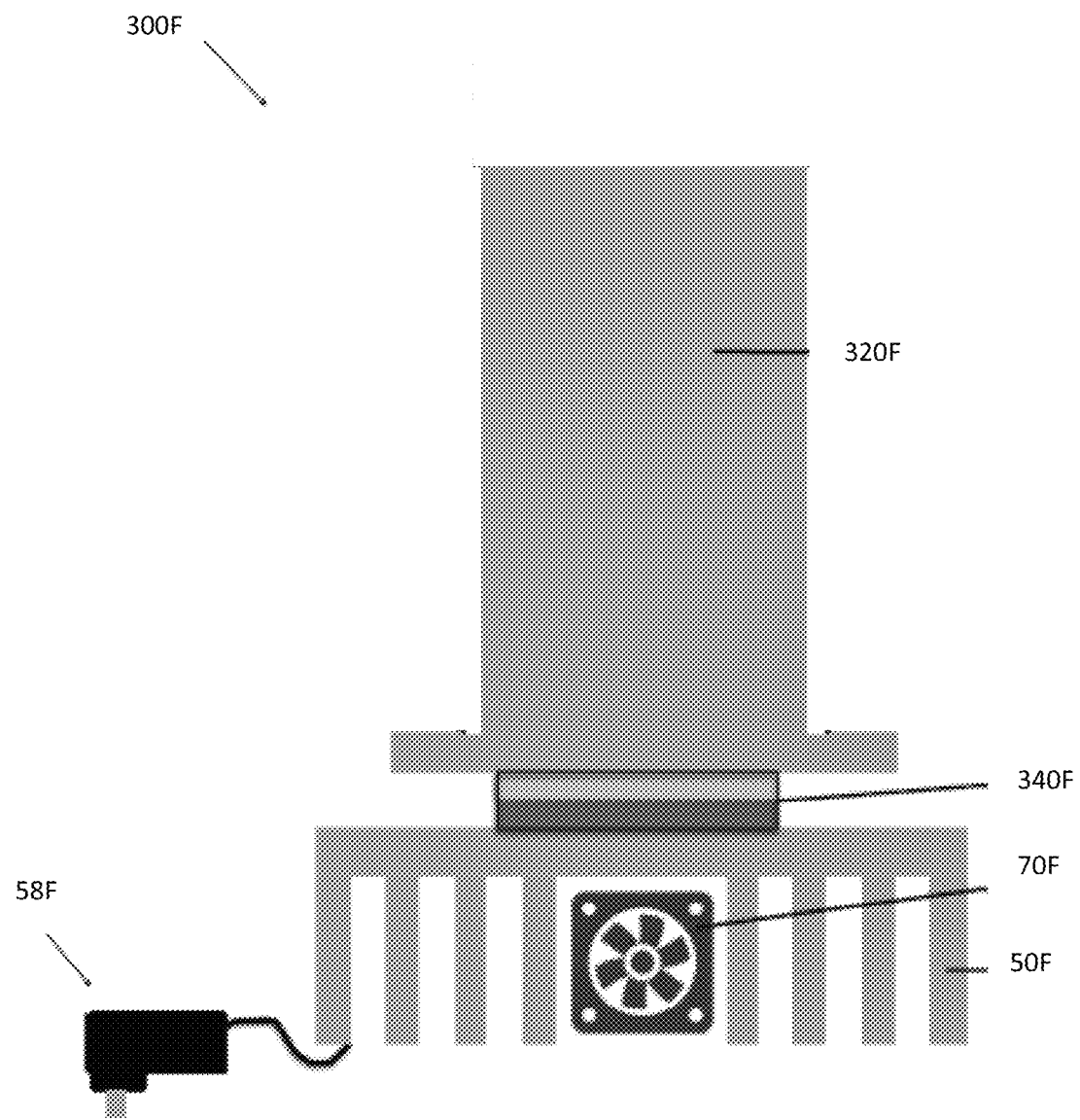
FIG. 9 is a schematic view of a charging module for use with a beverage container.

As discussed above, in one implementation, the container 100D and cooling unit 200D can be integral (e.g., the cooling unit 200D is not detachable from the vessel 10D). Also, in one implementation, the container 100E can be charged without the use of the charging module 300E. For example, the module 220D (of thermal mass or PCM) of the cooling unit 200D or the module 220E (of thermal mass or PCM) of the cooling unit 200E can be charged by placing the container 100D, 100E upside down on the charging module 300F shown in FIG. 9 (e.g., so that the post or thermal mass module 320F (e.g., cold side heat sink) of the charging module 300F extends into the chamber 12D, 12E and contacts the base (e.g., base 240D, 240E) of the chamber 12D, 12E. The post or thermal mass module 320F is thermally coupled to one or more thermoelectric elements 340F (e.g., one or more Peltier elements, multiple Peltier elements). In one implementation, the post or thermal mass module 320F can optionally have one or more volumes (e.g., a plurality of volumes) of phase change material (PCM) (e.g., similar to the PCM described above) via which the post or thermal mass module 320F can function as a reservoir (e.g., cold storage reservoir), allowing the post or thermal mass module 320F to cool more than one container 100D, 100E sequentially (e.g., one after the other). The one or more thermoelectric elements 340F thermally couple to one or more heat sinks 50F (e.g., hot side heat sink). Optionally, the charging module 300F has one or more fans 70F operable to dissipate heat from the one or more heat sinks 50F along with heat dissipation via one or more fins of the one or more heat sinks 50F. The charging module 300F can optionally include a power connector 58F that can be coupled to wall outlet. Alternatively, the charging module 300F can be powered by one or more batteries.

The post or thermal mass module 320F can have an elongate body sized to extend into the chamber 12D, 12E of the container 100D, 100E when the container 100D, 100E is turned upside down and placed over the post or thermal mass module 320F. In one implementation, the charging module 300F is operable to charge the module 220D, 220E of thermal mass or PCM of the cooling unit 200D, 200E while the container 100D, 100E is disposed (upside down) on the post or thermal mass module 320F. For example, the one or more thermoelectric elements 340F can draw heat from the post or thermal mass module 320F and transfer it to the one or more heat sinks 50F, where the heat can be dissipated via the fins of the heat sink 50F and/or the operation of the one or more fans 70F. In one implementation, the post 320F can have one or more (e.g., multiple) heat pipes to facilitate heat transfer through the post 320F. The cooled post or thermal mass module 320F can cool at least a portion of the container 100D, 100E. For example, the cooled post or thermal mass module 320F can cool at least the base 240D, 240E through conduction. Optionally, the cooled post or thermal mass module 320F can charge the module 220D, 220E of thermal mass or PCM (e.g., cause it to transition from one state to another state in which it can later absorb heat when a liquid is poured into the chamber 12D, 12E and cool or maintain the beverage at a cooled drinking temperature, as discussed above). In one implementation, the thermoelectric element 40D, 40E of the cooling unit 200D, 200E does not operate while the thermoelectric element 340F operates to charge the module 220D, 220E of thermal mass or PCM. In another implementation, the thermoelectric element 40D, 40E of the cooling unit 200D, 200E operate to draw heat from the module 220D, 200E of thermal mass or PCM and transfer it to the post or thermal mass module 320F, while the thermoelectric element 340F operates to draw heat from the post or thermal mass module 320F and transfers it to the heat sink 50F.

In one implementation, the charging module 300F (e.g., cooling rack) can be an appliance that can sit or be stored on a counter (e.g., kitchen counter, café counter) with multiple posts or thermal mass modules 320F and one or more containers 100D, 100E disposed on the charging module 300F to keep them in a cooled state ready for use.

Figure 4:
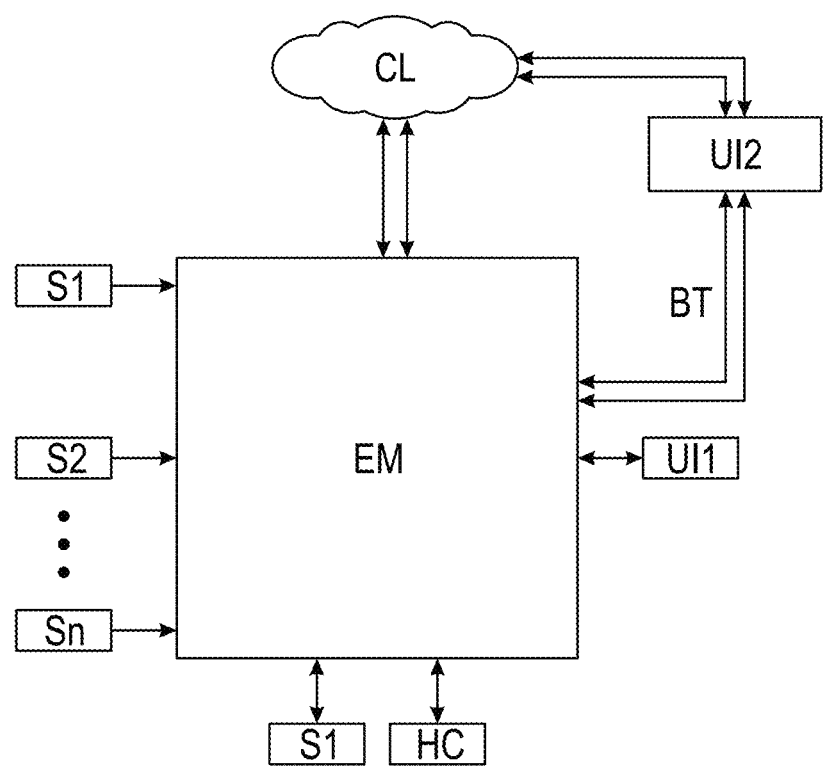
FIG. 4 is a schematic block diagram showing communication between the cooler container and a remote electronic device.

FIG. 4 shows a block diagram of a control system for (e.g., incorporated into) the devices described herein (e.g., the cooler container assembly 100, 100A, 100B, 100C, 100D, 100E). In the illustrated embodiment, circuitry EM (e.g., control circuitry, microcontroller unit MCU, computer processor(s), etc.) can receive sensed information from one or more sensors S1-Sn (e.g., temperature sensors, battery charge sensors, load sensors, radiofrequency identification or RFID reader, etc.). The circuitry EM can be housed in the cavity below the vessel 10, 10A, 10B, 10C. The circuitry EM can receive information from and/or transmit information (e.g., instructions) to one or more heating or cooling elements HC, such as the thermoelectric element 40, 40A, 40B, 40C, 40D, 40E (e.g., to operate thermoelectric element in a heating mode and/or in a cooling mode, turn off, turn on, vary power output of, etc.) and optionally to one or more power storage devices PS (e.g., batteries 60, 60B, 60C, 60D, 60E, such as to charge the batteries or manage the power provided by the batteries to the thermoelectric element).

Optionally, the circuitry EM can include a wireless transmitter, receiver and/or transceiver to communicate with (e.g., transmit information, such as sensed temperature, to and receive information, such as user instructions or temperature setpoint, from one or more of: a) a user interface UI1 on the unit (e.g., on the body of the container vessel 10), b) an electronic device ED (e.g., a mobile electronic device such as a mobile phone, PDA, tablet computer, laptop computer, electronic watch), c) via the cloud CL, or d) via a wireless communication system such as WiFi, broadband network and/or Bluetooth BT. The electronic device ED can have a user interface UI2, that can display information associated with the operation of the cooler container assembly 100, 100A, 100B, 100C, 100D, 100E, and that can receive information (e.g., instructions) from a user and communicate said information to the cooler container assembly 100, 100A, 100B, 100C, 100D, 100E.

Additional Embodiments

In embodiments of the present invention, a container with active temperature control, may be in accordance with any of the following clauses:

Clause 1: A container with active temperature control, comprising:
    an insulated vessel body having a chamber configured to receive a beverage therein;
    a cooling or heating unit comprising
        a thermoelectric element having a first side in thermal communication with at least a portion of the chamber,
        a module of thermal mass or phase change material in thermal communication with a second side of the thermoelectric element that is opposite the first side,
        a power storage device, and
        circuitry configured to control an operation of the thermoelectric element,
        wherein the cooling or heating unit is operable to increase or decrease or maintain a temperature of at least a portion of the beverage in the chamber by operating the thermoelectric element to draw heat from the chamber and transfer it to the module of thermal mass or phase change material.

Clause 2: The container of Clause 1, wherein the cooling or heating unit is detachable from the insulated vessel body.

Clause 3: The container of any preceding clause, wherein the cooling or heating unit comprises an insulated cover that defines a cavity that houses the thermoelectric element, the module of thermal mass or phase change material, the power storage device and the circuitry.

Clause 4: The container of Clause 3, wherein the insulated cover is a double-walled vacuum insulated cover.

Clause 5: The container of any preceding clause, wherein the insulated vessel body is a double-walled vacuum insulated vessel body.

Clause 6: The container of any preceding clause, wherein the cooling or heating unit further comprises a heat spreader at least partially embedded in the module of thermal mass or phase change material.

Clause 7: The container of any preceding clause, wherein the thermoelectric element is ring-shaped.

Clause 8: The container of any preceding clause, wherein the circuitry is configured to wirelessly communicate with a remote electronic device.

Clause 9: A container system with active temperature control, comprising:
    an insulated vessel body having a chamber configured to receive a beverage therein;
    a cooling or heating unit comprising
        a thermoelectric element having a first side in thermal communication with at least a portion of the chamber, a module of thermal mass or phase change material in thermal communication with a second side of the thermoelectric element that is opposite the first side,
a power storage device, and
circuitry configured to control an operation of the thermoelectric element; and
a charging module for charging the cooling or heating unit;
wherein the cooling or heating unit is operable to increase or decrease or maintain a temperature of at least a portion of the beverage in the chamber by operating the thermoelectric element to draw heat from the chamber and transfer it to the module of thermal mass or phase change material.

Clause 10: The system of Clause 9, wherein the cooling or heating unit is detachable from a bottom end of the insulated vessel body.

Clause 11: The system of any of Clauses 9-10, wherein the cooling or heating unit when detached, can be coupled upside down to the charging module so that a heat sink of the charging module is in thermal communication with a base of the heating or cooling unit and a fan of the charging module is operable to dissipate heat from the heat sink, the thermoelectric element operable to transfer heat from the module of thermal mass or phase change material to the heat sink to thereby charge the module of thermal mass or phase change material.

Clause 12: The system of any of Clauses 9-11, wherein the cooling or heating unit comprises an insulated cover that defines a cavity that houses the thermoelectric element, the module of thermal mass or phase change material, the power storage device and the circuitry.

Clause 13: The system of Clause 11, wherein the insulated cover is a double-walled vacuum insulated cover.

Clause 14: The system of any of Clauses 9-13, wherein the insulated vessel body is a double-walled vacuum insulated vessel body.

Clause 15: The system of any of Clauses 9-14, wherein the cooling or heating unit further comprises a heat spreader at least partially embedded in the module of thermal mass or phase change material.

Clause 16: The system any of Clauses 9-15, wherein the thermoelectric element is ring-shaped.

Clause 17: The system of any of Clauses 12-16, wherein the insulated cover has a recessed wall spaced from an end of the cover so that when the cover is in contact with a surface, the recessed wall is not in thermal contact with the surface to inhibit heat transfer via the recessed wall.

Clause 18: The system of any of Clauses 9-17, wherein the charging module comprises a flexible bladder of heat transfer fluid and a thermoelectric element operable to heat or cool the heat transfer fluid, the flexible bladder configured to extend into a recess of the cover and to contact the recessed wall when the container is placed on the charging module, the thermoelectric element of the charging module operable to heat or cool the module of thermal mass or phase change material in the cooling or heating unit when the container is on the charging module.

Clause 19: The system of any of Clauses 9-17, wherein the charging module comprises a post having a thermal mass or a phase change material or one or more heat pipes, a thermoelectric element in thermal communication with the post, a heat sink in thermal communication with the thermoelectric element and a fan operable to dissipate heat from the heat sink, the post configured to receive the chamber of the container thereover when the container is disposed upside down on the post, the thermoelectric element of the charging module operable to heat or cool the module of thermal mass or phase change material in the cooling or heating unit when the container is upside down on the post.

Clause 20: The system of any of Clauses 9-19, wherein the circuitry is configured to wirelessly communicate with a remote electronic device.

While certain embodiments of the inventions have been described, these embodiments have been presented by way of example only, and are not intended to limit the scope of the disclosure. Indeed, the novel methods and systems described herein may be embodied in a variety of other forms. For example, though the disclosure above refers to a metal container being inserted into the container 100, 100A, 100B, 100C, 100D, 100E, it need not be a metal container and can be made of other material (e.g., plastic, such as a plastic water bottle). Additionally, though components above (e.g., battery 60, 60B, 60C, 60D, 60E, thermoelectric element 40, 40A, 40B, 40C, 40D, 40E, fan 70, 70B, 70C, 70D, 70E) may be described in the singular, one of skill in the art will recognize that the disclosure contemplates the use of a plurality of such components. Additionally, though the drawings show cross-sectional views, one of skill will recognize that the form factor of the container 100, 100A, 100B, 100C, 100D, 100E can in one embodiment be defined by rotating the cross-section shown in the drawings around a central axis (e.g., the container 100, 100A, 100B, 100C, 100D, 100E can be cylindrical in shape). Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A beverage container assembly, comprising:
    an insulated vessel having a chamber configured to receive a beverage therein; and
    a cooling or heating unit housed in a cavity of a double-walled insulated bottom cap attached to the insulated vessel, comprising:
        a thermoelectric element having a first side in thermal communication with at least a portion of the chamber,
        a module of phase change material at least a portion of which is contained in the bottom cap, the phase change material in thermal communication with a side of the thermoelectric element,
        a power storage device,
        circuitry configured to control an operation of the thermoelectric element, and
        one or more sensors operable to sense one or more parameters in the chamber or cavity, the one or more sensors configured to communicate the sensed parameters to the circuitry,
        wherein the cooling or heating unit is operable to operate the thermoelectric element to draw heat from the chamber and transfer it to the module of phase change material.

2. The beverage container assembly of claim 1, wherein the insulated vessel comprises an inner wall and an outer wall spaced from the inner wall to define a gap therebetween.

3. The beverage container assembly of claim 2, wherein the gap is filled with an insulating material.

4. The beverage container assembly of claim 2, wherein the gap is under vacuum.

5. The beverage container assembly of claim 1, wherein the insulated vessel comprises glass.

6. The beverage container assembly of claim 1, wherein the bottom cap is removably coupleable to the insulated vessel.

7. The beverage container assembly of claim 1, wherein the bottom cap comprises a base in thermal communication with a surface of the thermoelectric element opposite the module of phase change material, the thermoelectric element being in thermal communication with the chamber via the base.

8. The beverage container assembly of claim 7, wherein the insulated vessel has an open first end and an open opposite second end that is closed by the base so that the base defines a bottom of the chamber.

9. The beverage container assembly of claim 1, wherein the circuitry is configured to wirelessly communicate with a remote electronic device.

10. The beverage container assembly of claim 1, wherein the one or more sensors include a temperature sensor operable to sense a temperature of a liquid in the chamber.

11. The beverage container assembly of claim 1, wherein the one or more sensors include a sensor operable to sense a presence of a liquid in the chamber.

12. A beverage container assembly, comprising:
    an insulated vessel having a chamber configured to receive a beverage therein; and a cooling or heating unit housed in a cavity of a bottom cap attached to the insulated vessel, comprising:
- a thermoelectric element having a first side in thermal communication with at least a portion of the chamber,
- a module of phase change material at least a portion of which is contained in the bottom cap, the phase change material in thermal communication with a side of the thermoelectric element,
- a power storage device, and
- circuitry configured to control an operation of the thermoelectric element,
- wherein the cooling or heating unit is operable to operate the thermoelectric element to draw heat from the chamber and transfer it to the module of phase change material.

13. The beverage container assembly of claim 12, wherein the insulated vessel comprises an inner wall and an outer wall spaced from the inner wall to define a gap therebetween.

14. The beverage container assembly of claim 13, wherein the gap is filled with an insulating material.

15. The beverage container assembly of claim 13, wherein the gap is under vacuum.

16. The beverage container assembly of claim 12, wherein the insulated vessel comprises glass.

17. The beverage container assembly of claim 12, wherein the bottom cap is removably coupleable to the insulated vessel.

18. The beverage container assembly of claim 17, further comprising a charging module comprising a heat sink and a fan operable to draw air into the charging module via one or more intake openings and exhaust air from the charging module via one or more exhaust openings.

19. The beverage container assembly of claim 18, wherein the bottom cap when detached from the insulated vessel, can be coupled upside down to the charging module so that the heat sink of the charging module is in thermal communication with a base of the cooling or heating unit and the fan of the charging module is operable to dissipate heat from the heat sink, the thermoelectric element operable to transfer heat from the module of phase change material to the heat sink to thereby charge the module of phase change material.

20. The beverage container assembly of claim 12, wherein the bottom cap comprises a base in thermal communication with a surface of the thermoelectric element opposite the module of phase change material, the thermoelectric element being in thermal communication with the chamber via the base.

21. The beverage container assembly of claim 20, wherein the insulated vessel has an open first end and an open opposite second end that is closed by the base so that the base defines a bottom of the chamber.

22. The beverage container assembly of claim 12, wherein the circuitry is configured to wirelessly communicate with a remote electronic device.

\* \* \* \* \*

UNITED STATES PATENT AND TRADEMARK OFFICE
CERTIFICATE OF CORRECTION

PATENT NO. : 12,480,691 B2  
APPLICATION NO. : 18/638443  
DATED : November 25, 2025  
INVENTOR(S) : Clayton Alexander Page 1 of 1

It is certified that error appears in the above-identified patent and that said Letters Patent is hereby corrected as shown below:

In the Specification

Under Column no. 3, Line no. 45, replace "65.5 mm+2 mm." with "65.5 mm ± 2 mm.".

Signed and Sealed this  
Sixth Day of January, 2026

John A. Squires  
*Director of the United States Patent and Trademark Office*